US011022719B2

(12) United States Patent
Lemos et al.

(10) Patent No.: US 11,022,719 B2
(45) Date of Patent: *Jun. 1, 2021

(54) STATISTICAL BLENDING OF WEATHER DATA SETS

(71) Applicant: The Climate Corporation, San Francisco, CA (US)

(72) Inventors: Ricardo T. Lemos, San Francisco, CA (US); Stephan Hoyer, San Francisco, CA (US)

(73) Assignee: THE CLIMATE CORPORATION, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/852,264

(22) Filed: Apr. 17, 2020

(65) Prior Publication Data

US 2020/0241171 A1 Jul. 30, 2020

Related U.S. Application Data

(63) Continuation of application No. 16/280,419, filed on Feb. 20, 2019, now Pat. No. 10,634,817, which is a (Continued)

(51) Int. Cl.
  G01W 1/10 (2006.01)
  G06N 20/10 (2019.01)
  (Continued)

(52) U.S. Cl.
  CPC ............... G01W 1/10 (2013.01); G06F 17/16 (2013.01); G06F 17/18 (2013.01); G06N 20/10 (2019.01);
  (Continued)

(58) Field of Classification Search
  CPC .......... G01W 1/10; G06F 17/16; G06F 17/18; G06F 17/30241; G06T 17/05
  See application file for complete search history.

(56) References Cited

U.S. PATENT DOCUMENTS 7,305,304 B2 12/2007 Leyton
8,577,828 B2 11/2013 Tabak
(Continued)

FOREIGN PATENT DOCUMENTS

| EP | 1 110 381 A1 | 6/2001 |
| WO | WO00/13407 | 3/2000 |
| WO | WO 2006/097926 A2 | 9/2006 |

OTHER PUBLICATIONS

Wilks, Daniel, "A Gridded Multisite Weather Generator and Synchronization to Observed Weather Data: Gridded and Synchronized Weather Generator", vol. No. 10, dated Oct. 10, 2009, 11 pages.
(Continued)

*Primary Examiner* — Elias Desta
(74) *Attorney, Agent, or Firm* — Hickman Becker Bingham Ledesma LLP; Malgorzata A. Kulczycka

(57) ABSTRACT

In an approach, a method for fusing point data with areal averages is performed by a computing system. The fusion procedure is coherent, in the sense that the computing system takes into account what the areal averages represent with respect to the point data. The overarching goal is to fit a model that takes into account the information derived from both data sets. The areal averages provide an estimate for what the integral of a model representing the behavior of the environmental variable should be over a particular district and the point values indicate the estimated value at particular locations. Thus, the integral of the fitted model over a district of the grid should approximate the value provided by the areal averages while also approximating the value provided by the point data for locations which are provided by the point data.

20 Claims, 9 Drawing Sheets

Related U.S. Application Data continuation of application No. 15/153,392, filed on May 12, 2016, now Pat. No. 10,267,951.

(51) Int. Cl.
*G06F 17/16* (2006.01)
*G06F 17/18* (2006.01)
*G06N 3/00* (2006.01)
*G06N 3/12* (2006.01)

(52) U.S. Cl.
CPC ............. *G06N 3/006* (2013.01); *G06N 3/126* (2013.01); *Y02A 90/10* (2018.01)

(56) References Cited

U.S. PATENT DOCUMENTS

| | | | |
|---|---|---|---|
| 8,849,622 B2 | 9/2014 | Melkumyan | |
| 10,175,387 B2 | 1/2019 | Kleeman | |
| 10,267,951 B2 | 4/2019 | Lemos | |
| 10,335,983 B2 | 7/2019 | Carter | |
| 10,664,634 B2 * | 5/2020 | Gentilhomme | G06F 17/18 |
| 2007/0168155 A1 | 7/2007 | Ravela et al. | |
| 2012/0148103 A1 | 6/2012 | Hampel et al. | |
| 2015/0234880 A1 | 8/2015 | Huber et al. | |
| 2016/0356515 A1 | 12/2016 | Carter | |
| 2017/0329048 A1 | 11/2017 | Lemos | |

OTHER PUBLICATIONS

The International Bureau of WIPO, "International Preliminary Report on Patentability", in application No. PCT/US2017/031621, dated Nov. 13, 2018, 4 pages.

Meng et al., "Learning Latent Variable Gaussian Graphical Models", dated 2014, ICM, vol. 32, pp. 1-9.

Li M et al., "An Improved Statistical Approach to Merge Satellite Rainfall Estimates and Raingauge Data", Journal of Hydrology, Elsevier, Amsterdam, NL, vol. 385, No. 1-4, dated May 7, 2010, 14 pages.

Kleiber et al., "Daily Spatiotemporal Precipition Simulation Using Latent and Transformed Gaussian Processes: Precipitation Simulation Using Gaussian Processes", vol. 48 No. 1, Jan. 1, 2012, 17 pgs.

Journee M. et al., "Improving the Spatio-Temporal Distribution of Surface Solar Radiation Data by Merging Ground and Satellite Measurements", vol. 11, No. 11, dated Nov. 15, 2010, pp. 2692-2704.

International Searching Authority, "Search Report" in application No. PCT/US17/31621, dated Jul. 27, 2017, 15 pages.

European Patent Office, "Search Report" in application No. 17796643.9-1001, dated Jan. 21, 2020, 9 pages.

European Patent Office, "Search Report" in application No. 16793104.7-1209, dated Dec. 6, 2018, 31 pages.

European Claims in application No. 17796643.9-1001, dated Jan. 2020, 4 pages.

European Claims in application No. 16793104.7-1209, dated Dec. 2018, 7 pages.

Current Claims in application No. PCT/US2017/031621, dated Nov. 2018, 7 pages.

Current Claims in application No. PCT/US17/31621, dated Jul. 2017, 7 pages.

Chappell et al. "Evaluating Geostatistical Methods of Blending Satellite and Gauge Data to Estimate Near Real-Time Daily Rainfall for Australia", vol. 493, dated Apr. 24, 2013, pp. 105-114.

\* cited by examiner (a)

STATISTICAL BLENDING OF WEATHER DATA SETS

BENEFIT CLAIM

This application claims the benefit under 35 U.S.C. § 120 as a Continuation of application Ser. No. 16/280,419, filed Feb. 20, 2019, which is a Continuation of application Ser. No. 15/153,392, filed May 12, 2016, now U.S. Pat. No. 10,267,951, issued on Apr. 23, 2019, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2020 The Climate Corporation.

FIELD OF THE DISCLOSURE

The present disclosure relates to computer-based systems that are programmed for blending together multiple different weather data sets in a statistically sound manner. More specifically, the present disclosure relates to using computer programs to blend together weather data sets that have different support, such as blending together point data with areal averages.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Weather forecasting is the application of science, technology, and statistics to predict the state of the atmosphere for a given location at some future point in time. The endeavor to fully understand Earth's climate system and to predict the weather has been a goal of humanity for millennia. Weather forecasts are typically made by collecting quantitative data about the current state of the atmosphere at a given place and using the data to drive a simulation or physical model of the atmosphere to predict how the atmosphere will change over a given period of time. For example, identifying changes in environmental variables such as temperature, air currents, barometric pressure, moisture, and so forth.

The collection of the quantitative data is performed by using various tools, such as satellite image data, weather stations, temperature readings, humidity detectors, and so forth. Physical models used for weather forecasting decompose the earth (or other geographical region) into a uniform grid where the various environmental variables are given a particular value at each location within the grid. The physical model then runs through the grid simulating the physical processes that cause changes in weather over time to reach a future predicted state. However, the base data collected from the various weather stations do not fully cover the grid, nor are the readings taken at uniform times or with tools that have identical measurement errors. In fact, in most cases there are far more points on the grid where the environmental variables are unknown than known. As a result, to convert the base observations into values for each point on the grid, a process known as data assimilation is performed which uses a combination of information to fill in the points where observations are not explicitly available. The result is a value for each of the environmental variables for each point in the grid, which is collectively referred to as an "analysis". The analysis is then used to set the initial state of the physical model simulation which is stepped forward in time to predict the weather at some future time. In some cases, a forecast model is also used to fill in the informational gaps, which is referred to as an analysis/forecast cycle. In essence, an initial condition is set by an analysis, a forecast is run from the analysis, and the forecast is then used to fill in or smooth out the gaps in the next analysis in a repeating cycle.

Since the initial condition of the atmosphere generated by the analysis is uncertain due to the observational data being incomplete, climate scientists will often run forecasts using a set of different initial states based on the known or estimated error of an analysis. The resulting forecasts, each representing the future state of the atmosphere assuming that the values of the environmental variables in the grid were in a slightly different initial state is referred to as a forecast ensemble. The overall behavior of the ensemble, rather than simply one forecast, is then used to better capture the uncertainty in the forecast.

In most cases, the analyses are performed by government agencies (and in some cases private agencies) and made available via various databases, for example the U.S. Climate Forecast System (CFS), the European Centre for Medium-Range Weather Forecasts (ECMWF), and so forth, which provide analyses that can be accessed and used for research by weather scientists. These organizations often provide analyses at different granularities of time, such as six hours, daily, weekly, and so forth, as well as at different geographical granularities (for example different grid sizes).

Data assimilation techniques and forecasting models constantly evolve over time as atmospheric scientists develop a better understanding of the physical processes governing atmospheric evolution. As a result, if one were to view the analyses taken by various public and private organizations over an extended period of time (for example the last thirty-forty years), the changes in the data assimilation technique or forecasting model used can have a drastic impact on the analysis and the resulting forecast. To combat the non-uniformity of the techniques used to create the original analysis, climate monitoring organizations will often go back to the original observation data collected over a past period of time and apply a consistent data assimilation technique (usually one that is more up-to-date than the original technique) from that past period of time to the present. As a result, the inconsistencies are removed and the skill of forecasting models can be more easily evaluated. An analysis that is produced in this manner is referred to as a "reanalysis" since the data is being reanalyzed using a consistent technique.

Evaluating the skill of a forecast model requires a significant amount of forecasted predictions and corresponding observations with which to compare those predictions. However, when testing a new model, it is impractical to train on historical observation data and then evaluate at some point in the future based upon the analysis generated at that time.

Especially for longer range forecasts, it might take over a month before a given forecast can be evaluated, and years or decades before enough data can be collected to tell whether the forecast model is actually skillful. As a result, climate scientists often perform "reforecasts", which is a forecast based on past analyses (or more preferably reanalyzes). For example, if a reanalysis covers the past 30 years, a forecast model can be initialized from those conditions and used to produce simulated forecasts across the 30 year period. Thus, a reforecast provides evidence of what a forecast model would predict if it had been used to forecast environmental conditions at some previous point in time. As a result, the predictive skill of the forecast model can be evaluated at a variety of leads by comparing the predictions to the corresponding observed environmental conditions at that time.

SUMMARY OF THE DISCLOSURE

The appended claims may serve as a summary of the disclosure.

BRIEF DESCRIPTION OF THE DRAWINGS

In the drawings:

FIG. 9 depicts an example embodiment of a spreadsheet view for data entry.

DETAILED DESCRIPTION

Figure 1:
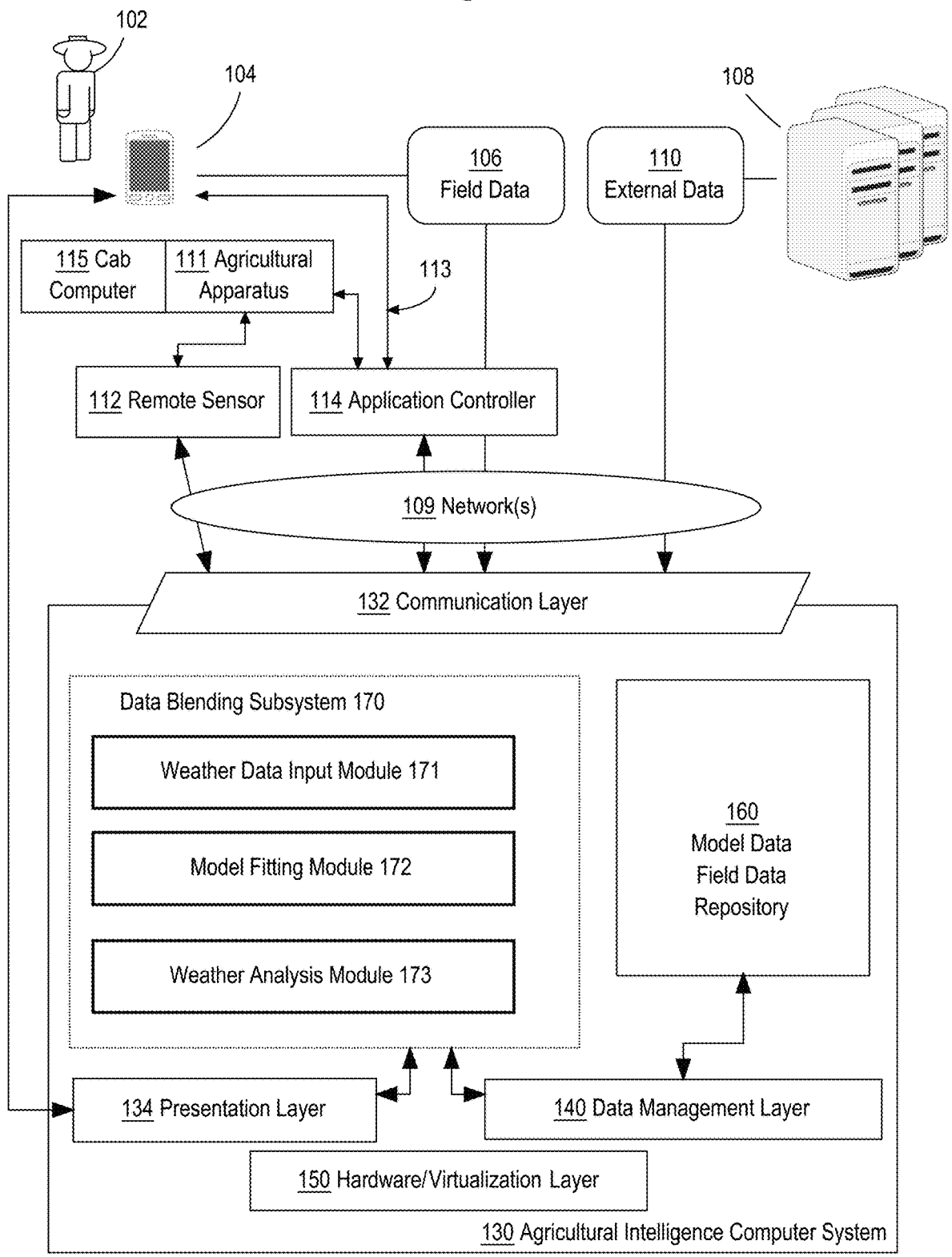
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. The description is provided according to the following outline:
1.0 General Overview
2.0 Example Agricultural Intelligence Computer System
  2.1 Structural Overview
  2.2 Application Program Overview
  2.3 Data Ingest to the Computer System
  2.4 Process Overview—Agronomic Model Training
  2.5 Data Blending Subsystem
    2.5.1 Data Blending Subsystem Functional Overview
  2.6 Implementation Example—Hardware Overview
3.0 Example System Inputs
4.0 Gaussian Model
  4.1 Notation
  4.2 Temporal Variability
  4.3 Spatial Variability
  4.4 Multivariate Model
  4.5 Point Measurements v. Areal Averages
  4.6 Model Summary
  4.7 Covariance
  4.8 Initial and Posterior Mean States
  4.9 Log-Likelihood Function
  4.10 Missing Observations
  4.11 Hindcasts and Reforecasts
  4.12 Backward Smoothing
  4.13 Backward Sampling
5.0 Data Blending Process Flow
6.0 Prediction Process Flow
7.0 Use Cases
8.0 Extensions and Alternatives
9.0 Additional Disclosure
1.0 General Overview The problems of uncertainty quantification and data fusion with change of support (for instance, blending point data with areal averages) are ubiquitous in weather and agronomic research. For example, many applications of weather analysis, such as predictive modeling, require probabilistic estimates of historical and forecast weather blended from a multitude of sources. One major challenge is to make the most of the many data sets available for each weather variable. First of all, each variable has its own spatial and temporal extent, support (for example point data vs. areal data), and resolution. For example, reanalyze and satellite data are typically gridded areal averages, whereas weather station data represent point data that is irregularly distributed in space. Moreover, each data set has its own level of accuracy, which may or may not be available to researches. However, by comparing multiple data sets, the biases inherent to those data sets can be quantified, the instrument precision can be estimated, and the data set(s) most appropriate for a specific purpose can be assessed.

In an embodiment, a scalable Bayesian approach is applied that is agnostic with respect to the type of data being modeled, as well as the spatial and temporal resolution. The approach relies on discrete process convolutions to produce a smooth spatial interpolation over the domain of interest, which can be approximated by local second-degree polynomials to estimate areal averages. To capture temporal variability, a first order Markov process is specified for gridded baselines and seasonal components. The result is a state-space model with basic forecasting ability. The approach described herein does not require costly manipulations, such as inversions or factorizations, of large matrices and can account for location-dependent and time-dependent instrument precision, as well as missing values.

In an embodiment, a method for fusing point data (such as weather station measurements) with areal data (such as reanalyzes and/or remote sensing products) is performed by a computing system. The fusion procedure is coherent, in the sense that the computing system takes into account what the areal data represents with respect to the point data. For example, areal data represents the average value of an environmental variable across a district of a spatial grid. The grid may represent any arbitrary area, such as a particular parcel of land, a state, a country, the world, and so forth, with a district or square representing a sub-area of the grid. Point data represents a value of a weather variable at a particular point within the grid. The overarching goal is to fit a model that takes into account the information derived from both data sets. For instance, the areal averages provide an estimate for what the integral of the function representing the behavior of the environmental variable should be for a particular place and time, whereas the point values indicate the estimated value at particular locations. Thus, the integral of the fitted model over a district of the grid should approximate the estimate of the integral provided by the areal data while the behavior of the model should approximate the point values for locations at or near the points for which values are provided by the point data.

In an embodiment, a hierarchical Bayesian state-space approach is utilized that decomposes generating blended estimates that vary in space and time into two distinct problems. The first problem addresses change-of-support and statistical interpolation on the spatial side. The second problem addresses how to account for seasonal and inter-annual variability for various parameters on the temporal side.

Other features and aspect of the disclosure will become apparent in the drawings, description, and claims.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 8:
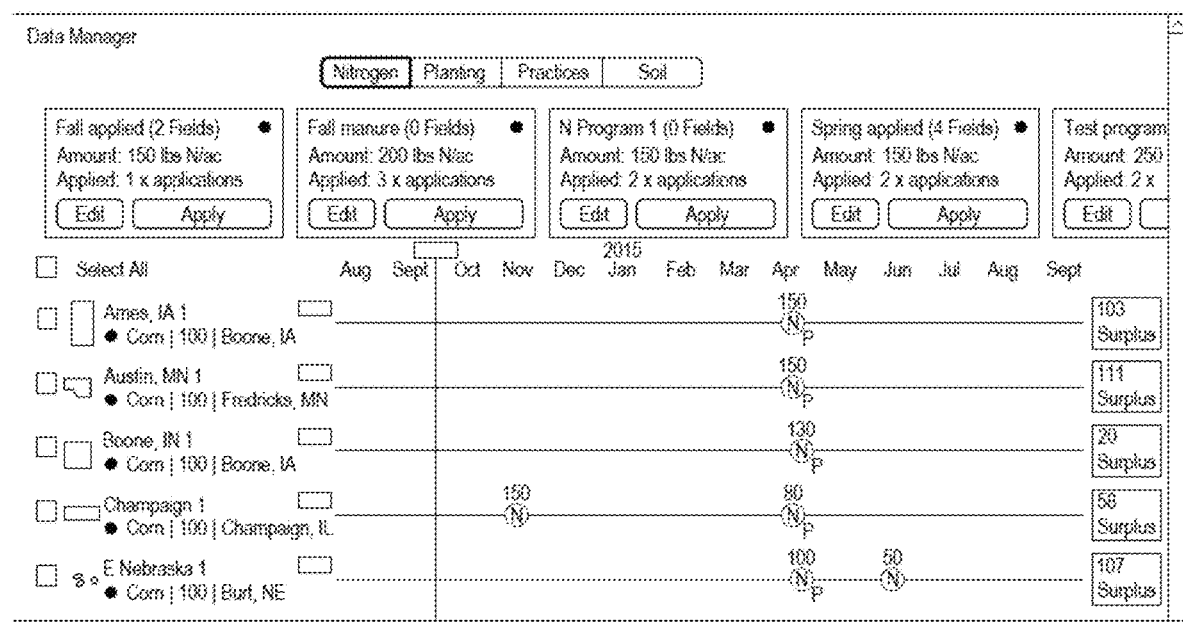
FIG. 8 depicts an example embodiment of a timeline view for data entry.

FIG. 8 depicts an example embodiment of a timeline view for data entry. Using the display depicted in FIG. 8, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 8, the top two timelines have the "Fall applied" program selected, which includes an application of 150 lbs. N/ac in early April. The data manager may provide an interface for editing a program. In an embodiment, when a particular program is edited, each field that has selected the particular program is edited. For example, in FIG. 8, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 8, the interface may update to indicate that the "Fall applied" program is no longer being applied to the top field. While the nitrogen application in early April may remain, updates to the "Fall applied" program would not alter the April application of nitrogen.

Figure 9:
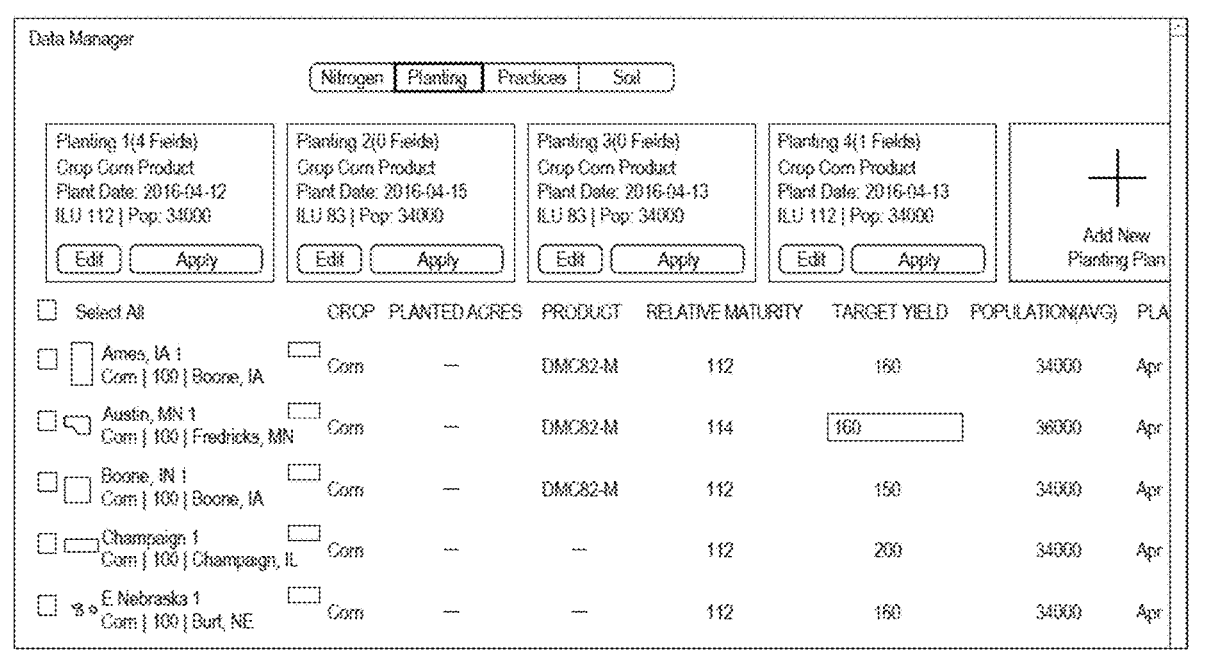

FIG. 9 depicts an example embodiment of a spreadsheet view for data entry. Using the display depicted in FIG. 9, a user can create and edit information for one or more fields. The data manager may include spreadsheets for inputting information with respect to Nitrogen, Planting, Practices, and Soil as depicted in FIG. 9. To edit a particular entry, a user computer may select the particular entry in the spreadsheet and update the values. For example, FIG. 9 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
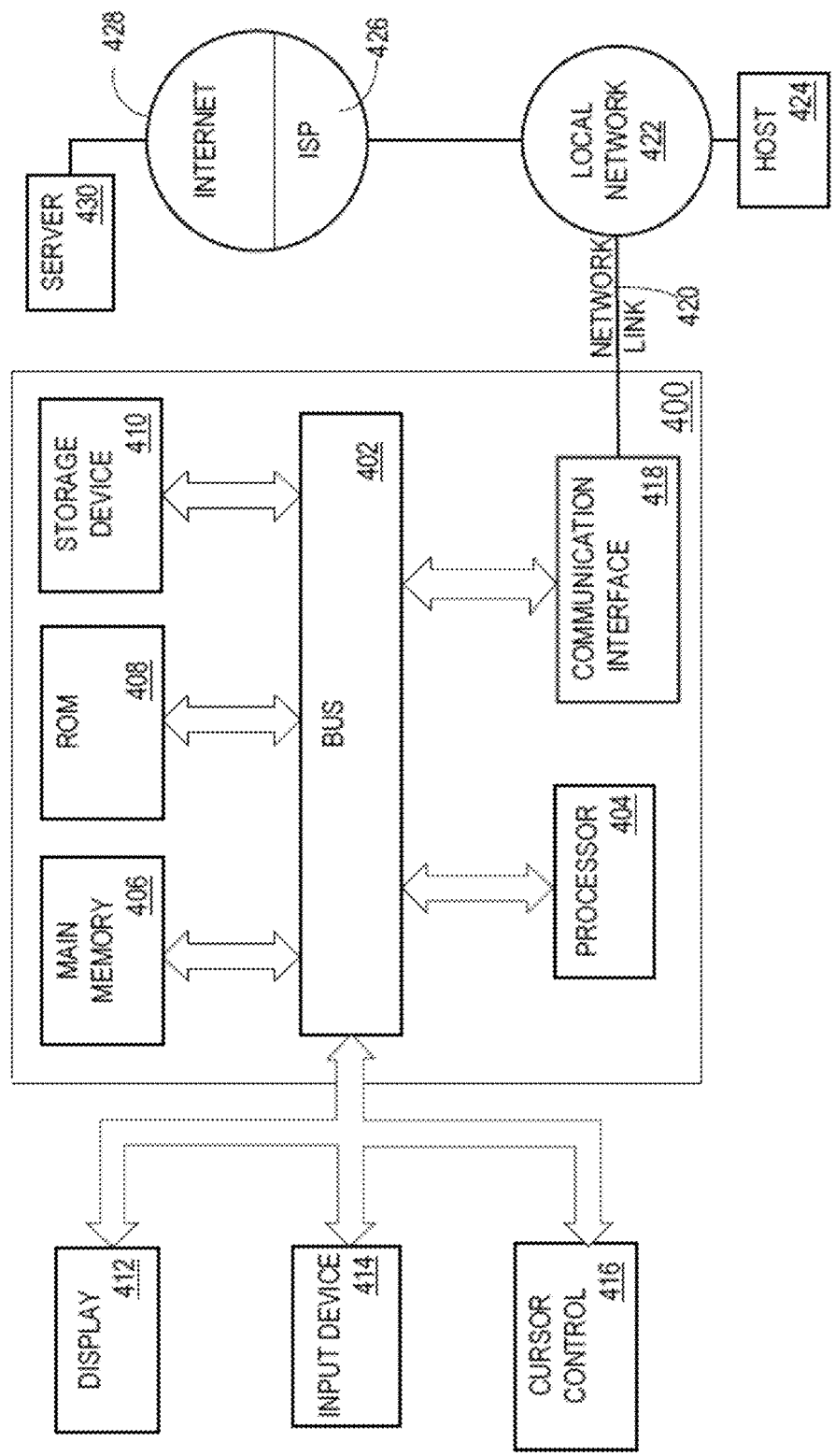
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

Figure 2:
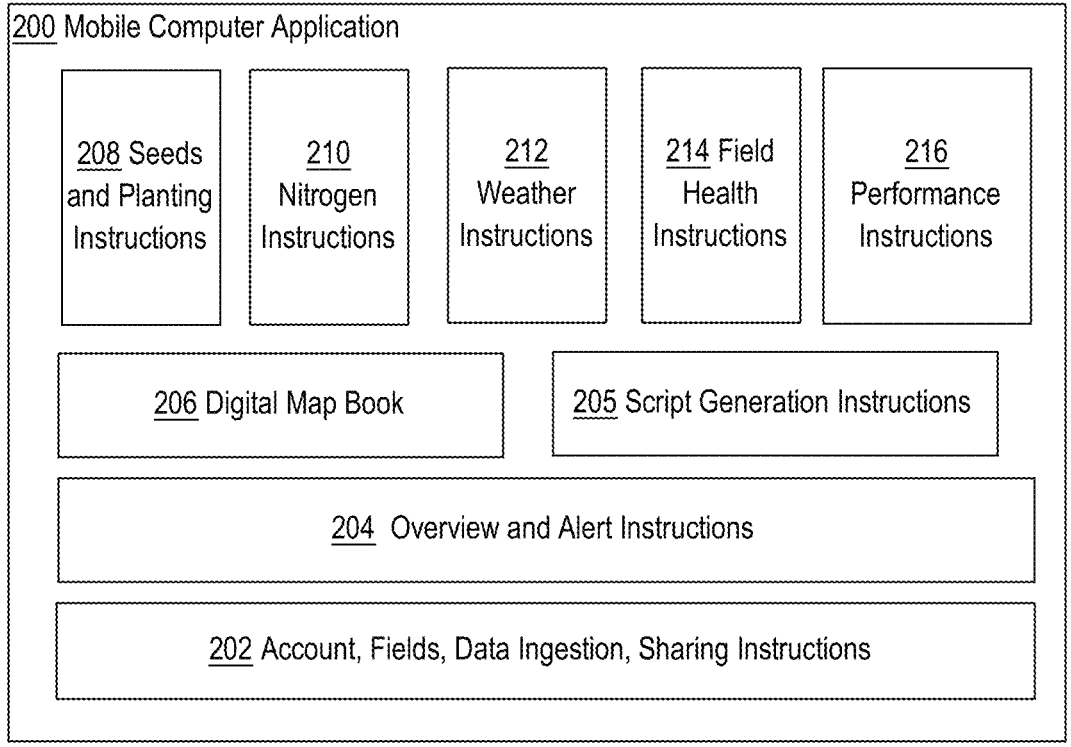
FIG. 2 illustrates two views of an example logical organization of sets of instructions in main memory when an example mobile application is loaded for execution.
Figure 2:
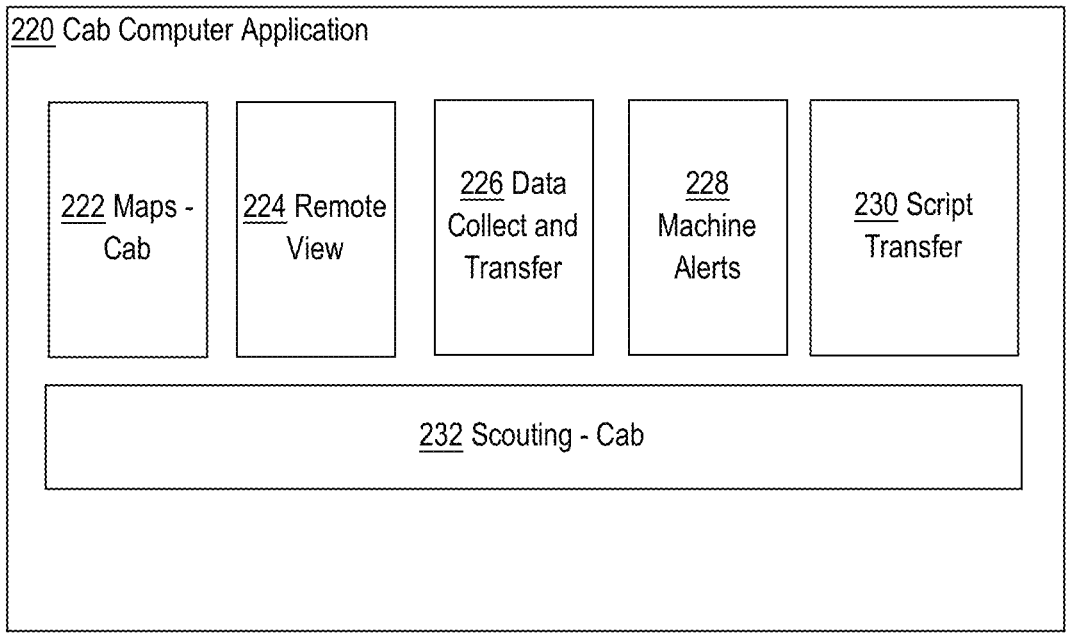

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use. In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In another embodiment, sensors 112 and controllers 114 may comprise weather devices for monitoring weather conditions of fields. For example, the apparatus disclosed in International Pat. Application No. PCT/US2016/029609 may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
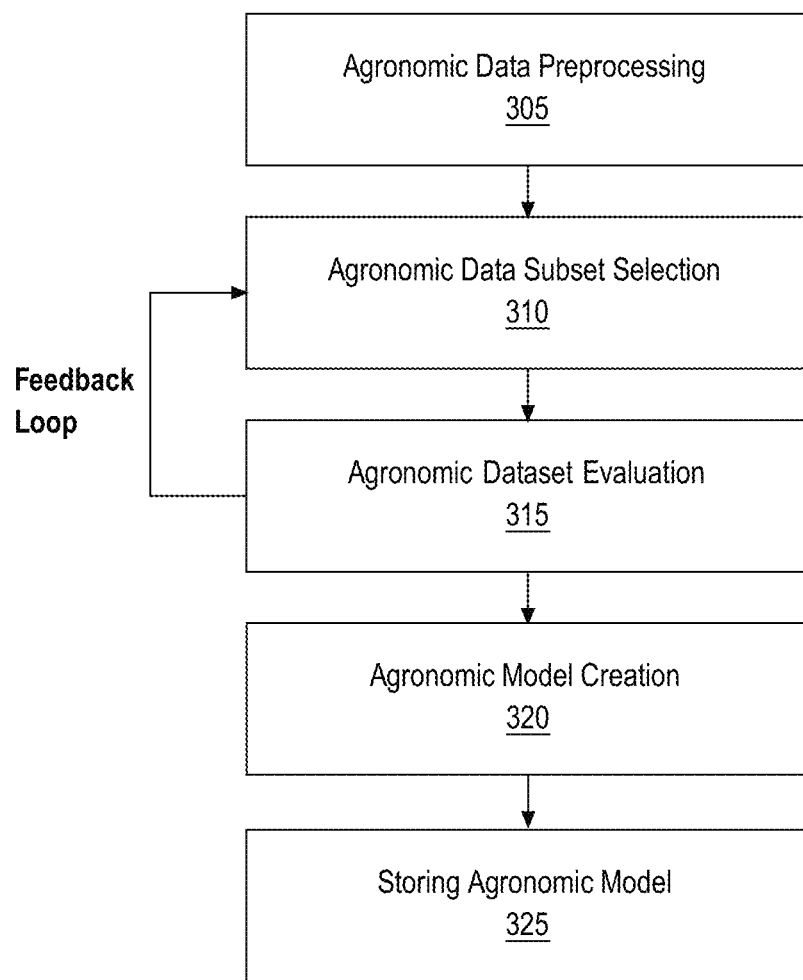
FIG. 3 illustrates a programmed process by which the agricultural intelligence computer system generates one or more preconfigured agronomic models using agronomic data provided by one or more external data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Data Blending Subsystem

In an embodiment, data blending subsystem 170 includes components that retrieve observations (including point measurements and areal averages), process the observations to fit a model that blends the point measurements and areal averages, and then uses the fitted model to generate predictions for previously unknown spatio-temporal coordinates. The data blending subsystem 170 and the components contain therein may represent software instructions (for example source and/or compiled program code), hardware components (for example application-specific integrated circuits and/or field programmable gate arrays), or combinations thereof. In an embodiment, the data blending subsystem 170 includes weather data input module 171, model fitting module 172, and weather analysis module 173.

2.5.1 Data Blending Subsystem Functional Overview

Figure 5:
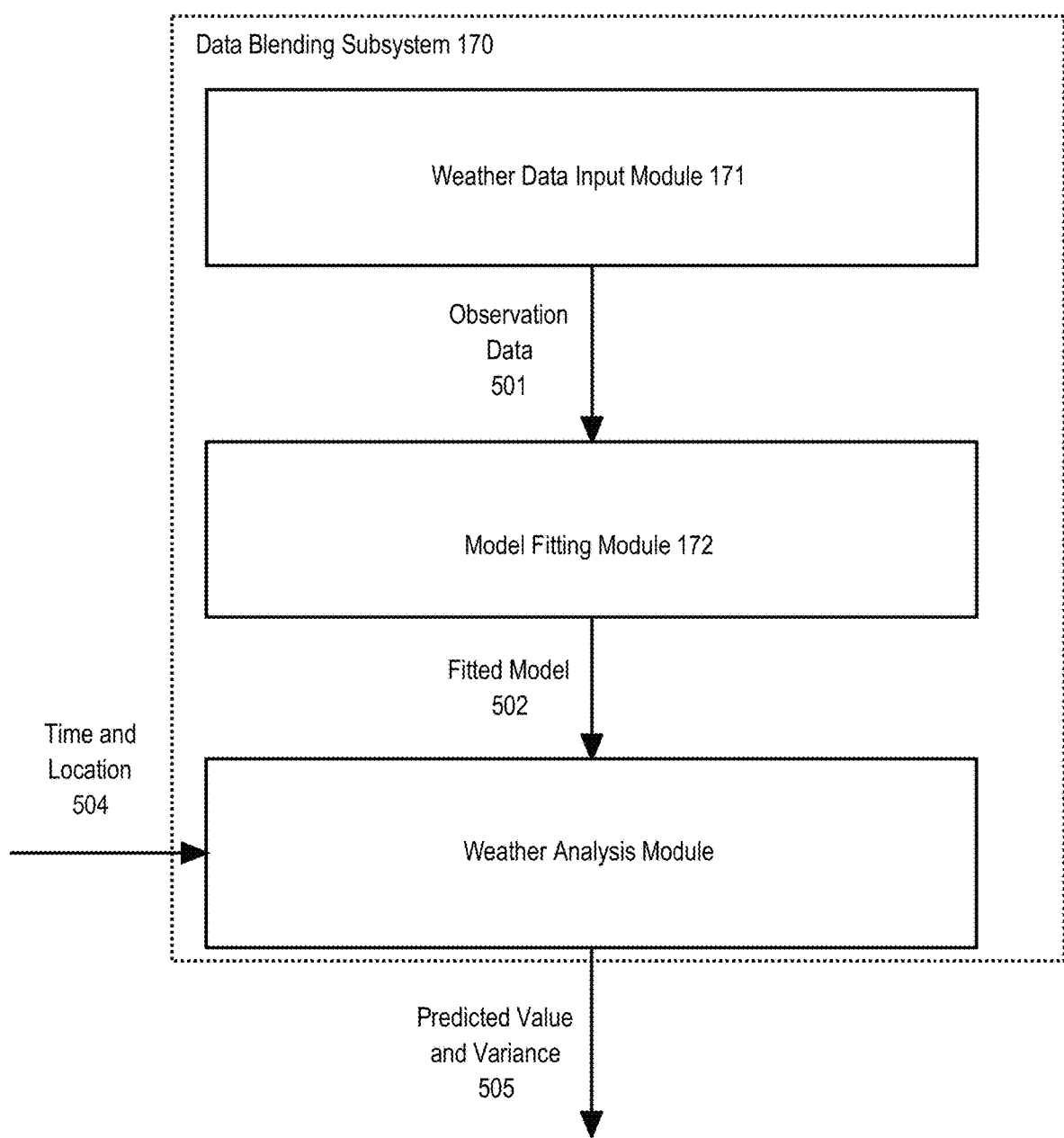
FIG. 5 illustrates a functional overview of a data blending subsystem according to an embodiment.

FIG. 5 illustrates an example functional overview for the data blending subsystem 170 according to an embodiment. In other embodiments, the depicted modules may be divided out into further sub-modules or combined into modules that are responsible for a greater number of tasks than those depicted in FIG. 5.

In FIG. 5, the weather data input module 171 retrieves observation data 501 for a particular environmental variable and passes the observation data 501 to the model fitting module 172. The observation data 501 may include point measurements (for example value and variance of the environmental variable at a particular point) and areal measurements (for example value and variance of the environmental variable averaged over a particular district of the grid). The observation data 501 may be collected from a variety of different sources, as is explained below in further detail in Section 3.0 ("Example System Inputs").

In an embodiment the model fitting module 172 constructs a state-space model describing the behavior of the environmental variable over space and time and fits the model to the observation data 501, resulting in fitted model 502. A detailed description of the model is described below in Section 4.0 ("Gaussian Model") and an example process for performing the fitting is described below in Section 5.0 ("Data Blending Process Flow"). In an embodiment, the fitted model 502 includes the mean and variances of a gridded set of latent Gaussian processes that, combined with an observation equation representing the harmonic frequencies of the environmental variable (for example yearly and seasonal oscillations), provides the behavior of the environmental variable over space and time.

In an embodiment, the weather analysis module 173 receives the fitted model 502 and a time and location 504 representing a new spatio-temporal coordinate. The weather analysis model 173 then uses the fitted model 502 to generate a predicted value and variance 505 of the environmental variable at the new spatio-temporal coordinate specified by the time and location 504.

2.6 Implementation Example-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3.0 Example System Inputs

In an embodiment, the observation data 501 that the data blending subsystem 170 uses to generate the fitted model 502 contains both point data and areal averages. Point data represents values and variances of a specific environmental variable that are recorded at various geographical coordinates. For example, one common source for point data are weather stations or sensors which are spread (often non-uniformly) across the area under observation. For instance, NOAA METAR station data available from the Aviation Weather Center could be used for the point data. Areal averages represent values and variances of a specific environmental variable that have been averaged across each district of a grid superimposed over the area under observation. For example, one common source for areal averages are analyses and reanalyzes which have been constructed by simulating the physical processes which govern the behavior of the environmental variable over time from an initial starting state. For instance, areal averages may be obtained from the ECMWF ERA-Interim analysis product available from the European Center for Medium-Range Weather Forecasts. Another common source of areal averages include remote sensing data, such as pixel data collected from satellites, where the "grid" is dependent on the spatial resolution at which the satellite or other remote sensing device can take measurements.

In some embodiments, in order to obtain the observation data 501, the data blending subsystem 170, via the weather data input module 171, accesses external data 110 stored on servers/databases belonging to weather statistics reporting agencies (such as the Aviation Weather Center and European Center for Medium-Range Weather Forecasts) by sending requests in any number of formats, such as HTTP requests, FTP requests, and so forth. In some embodiments, the weather data input module 171 proactively obtains the observation data 501 and stores the observation data in the model data and field data repository 160 for local processing by the other components of the data blending subsystem 170. For example, the weather data input module 171 may send periodic requests for updates to the external data 110 and then cache the returned information in the model data and field data repository 160 for local processing. In other embodiments, the weather data input module 171 obtains the external data 110 in response to receiving a request from the field manager computing device 104 or an application executing on the agricultural intelligence computer system 130 or an external client which invokes the data blending subsystem 170. The request may specify from which sources the observation data 501 should be obtained and/or the environmental variable for which the observation data 501 should be obtained.

4.0 Gaussian Model 4.1 Notation

Throughout the following description the following notation is used: unknown quantities (for example, stochastic processes and time-invariant parameters) are represented by Greek letters; observables and fixed quantities are denoted by upper case Roman letters (for example, $\sigma$); lower case Roman letters are employed primarily as indexes for arrays, and as auxiliary variables; matrices and vectors are typed in uppercase and lowercase bold font, respectively (for example, K and $\theta$); tilde is read as "follows the distribution" (for example $\sigma\sim$Normal[0,1]); and the prime character ' denotes transpose (for example, $\alpha'$).

4.2 Temporal Variability

The primary concern with respect to temporal variability when characterizing the hierarchical dynamic model is to decompose the time varying information present in the observation data 501.

Consider a set of N observations made on day t, $t\in\{1, 2, \ldots, T\}$, at spatial locations $s_1, \ldots, s_N$, within a two-dimensional domain. Let $Y_t^{raw}(s_i)$ denote the random variable associated with the i-th raw observation. The set of observations can be viewed as a combination of oscillations with different frequencies (annual, semi-annual, quarterly, and so forth), a time-varying baseline, and Gaussian white noise (Equation 1.0):

$$Y_t^{raw}(s_i) = x_t(s_i) + \zeta_t(s_i),$$

$$Y_t^{raw}(s_i) = x_t(s_i) + \zeta_t(s_i)$$

where (Equation 2.0):

$$x_t(s_i) = a_{1,t}(s_i) + \sum_{f=1}^{L} b_f \times \left\{ a_{2f,t}(s_i) \sin\left[\frac{2\pi f t}{365}\right] + a_{2f+1,t}(s_i) \cos\left[\frac{2\pi f +}{365}\right] \right\}$$

and $$\zeta_t(s_i) \sim \text{Normal}\left[0, \frac{v^2}{\tau}\right]$$

is noise with variance $v^2/\tau$. Equation 2.0 above assumes that leap days (February 29) are disregarded, leaving $\frac{1}{365}$ day$^{-1}$ as corresponding to the annual fundamental frequency, whereas the other L−1 oscillations are its harmonics. The value of L is fixed upon exploratory data analysis, such as through empirical testing/experimentation. The coefficients $\alpha_{1,t}(s_i), \ldots, a_{2L+1,t}(S_i)$ depend on the spatial location of the observation and also change over time. The factor $b_f$ is employed to dampen the temporal variability of high-frequency oscillations (through $\gamma_0$ and $\gamma_1$), (Equation 3.0):

$$b_f = (\gamma_0 + (1-\gamma_0) \times \exp[-\gamma_1(f-1)]),$$

Where $\gamma_0 \in [0,1]$, $\gamma_1 \in \mathbb{R}^+$, and $v \in \mathbb{R}$ are unknown parameters.

To make the model parsimonious, able to cope with large N and capable of performing spatial interpolation, the coefficients are mapped onto a set of gridded, latent Gaussian Processes (Equation 4.0):

$$a_{jt}(s_i) = \sum_{g=1}^{G} k[s_i, s_g^*] \times \theta_{jt}(s_g^*),$$

$$i \in \{1, \ldots, N\}, j \in \{1, \ldots, P\}, g \in \{1, \ldots, G\},$$

Where $k[s_i, s_g^*] \in [0,1]$ is a kernel evaluation, described further in Section 4.3, and $\theta_{jt}(s_g^*), t \in \{1, 2, \ldots, T\}$ is a latent Gaussian process, for any grid point $s_g^*$ and component j. The constant G denotes the number of points on a grid that is superimposed on the spatial domain under study.

Hence, in every grid point, there exists P=2L+1 latent Gaussian processes.

In some embodiments, the temporal evolution of the Gaussian Processes is modeled as a random walk:

$$\theta_{jt}(s_g^*) = \theta_{j,t-1}(s_g^*) + \varepsilon_{jt}(s_g^*), \varepsilon_{jt}(s_g^*) \sim \text{Normal}\left[0, \frac{c_t(s_g^*)}{\delta}\right].$$

In the expression above, the unknown parameter $\delta \in (0,1]$, also known as a discount factor, controls the decay of information over time. Further details regarding the evolution variance $c_t(s_g^*)$, for $t \in \{0, \ldots, T\}$ and $j \in \{1, \ldots, P\}$ is provided in Section 4.7 ("Covariance"). The evolution equation above allows for time and space varying amplitudes in the seasonal components and requires initial conditions, namely (Equation 5.0):

$$\theta_{j,0}(s_g^*) \sim \text{Normal}\,[m_{j,0}, c_0(s_g^*)].$$

4.3 Spatial Variability

In this section a means to generate the kernel evaluations $k[s_i, s_g^*]$, which connect the coefficient $\alpha_{j,t}(s_i)$ to the G latent, gridded Gaussian processes $\theta_{jt}(s_1), \ldots, \theta_{jt}(s_G^*)$ for $i \in \{1, \ldots, N\}$ and $j \in \{1, \ldots, P\}$ (See Equation 4.0). In an embodiment, Discrete Process Convolutions is used to generate the kernel evaluations.

As mentioned previously in Section 4.2 ("Temporal Variability"), suppose the spatial domain of interest is overlaid with a grid that has a total of G Points. To each grid point, a vector of P latent Gaussian Processes is assigned. The Mahalanobis distance between the observation i ($i \in \{1, \ldots, N\}$) and grid point g ($g \in \{1, \ldots, G\}$), respectively located at $s_i$ and $s_g^*$, is provided by $$\|s_i - s_g^*\|_{\Sigma_i} = \sqrt{d_{ig}' \Sigma_i^{-1} d_{ig}}$$

Where $d_{ig} = (\Delta x(s_i, s_g^*), \Delta y(s_i, s_g^*))$ is the vector of longitudinal and latitudinal distances between $s_i$ and $s_g^*$. In some embodiments, the 2×2 positive definite matrix $\Sigma_i$ is a location-independent, fixed multiple of the identity matrix $\Sigma_i = 4r^2 I_2$, where r is the grid resolution. Thus, the technique works with Euclidean distances, where the contribution of each observation is weighted based on the distance from that observation to each of the gridded points along the grid superimposed on the spatial domain. The unnormalized kernel associated with this pair of locations is (Equation 6.0):

$$k^{un}[s_i, s_g^*] = \left(1 - \min\left[1, \|s_i - s_g^*\|_{\Sigma}^2\right]\right)^2$$

Under the choice $\Sigma_i = 4r^2 I_2$, $\|d_{ig}\|_{\Sigma_i} = 1$ and $k^{un}[s_i, s_g^*] = 0$ is obtained whenever $\|d_{ig}\| = 2r$. In other words, the kernel's range corresponds to twice the grid resolution. In the G×1 vector of unnormalized kernel evaluations associated with location $s_i$, $k^{un}(s_i) = (k^{un}[s_i, s_1^*], \ldots, k^{un}[s_i, s_G^*])'$, the number of non-zero elements does not exceed 14, regardless of the location $s_i$ relative to the latent grid.

The normalized kernel is obtained by considering all G evaluations of the kernel centered at $s_i$ (Equation 7.0):

$$k[s_i, s_g^*] = \frac{k^{un}[s_i, s_g^*]}{\sum_{a=1}^{G} k^{un}[s_i, s_a^*]}$$

Hence, guaranteeing that $k[s_i, s_g^*] \in [0,1]$ and $\sum_{g=1}^{G} k[s_i, s_g^*] = 1$, for all i. Owing to this, the coefficient $\alpha_{j,t}(s_i)$ is a convex combination of the latent processes $\theta_{jt}(s_1), \ldots, \theta_{jt}(s_G^*)$.

4.4 Multivariate Model

Equation 2.0 may be written more succinctly. If d(t) is written as the day of year to which instant t belongs (for example d(1)=d(366)=d(−364)=1), and define 365 vectors of size P×1 (Equation 8.0):

$$w_h = \left(1, s_{1,h}, c_{1,h}, \ldots, s_{L,h}, c_{L,h}\right)', h \in \{1, 2, \ldots, 365\},$$

where $$s_{f,t} = b_f \times \sin\left[\frac{2f\pi t}{365}\right],$$

$$c_{f,t} = b_f \times \cos\left[\frac{2f\pi t}{365}\right],$$

for $f \in \{1, \ldots, L\}$. Also, let $k(s_i) = (k[s_i, s_1^*], \ldots, k[s_i, s_G^*])$, denote the G×1 vector of normalized kernel evaluations associated with location $s_i$, let $(\theta_{jt}(s_i^*), \ldots, \theta_{jt}(s_G^*))'$ represent the G×1 random vector associated with component j, and let these P vectors be stacked into $\theta_t \in \mathbb{R}^{GP \times 1}$. Then, using a Kronecker product, Equation 2.0 may be rewritten as (Equation 9.0):

$$x_t(s_i) = (w_{d(t)} \otimes k(s_i))' \theta_t.$$

Moreover, if there exists a vector of N observations, all collected on day t, it may be written as, $$Y_t^{raw} = (Y_t^{raw}(s_1), \ldots, Y_t^{raw}(s_N))',$$

and expand Equation 1.0 to a multivariate model (Equation 10.0):

$$Y_t^{raw} = x_t + \zeta_t, \zeta_t \sim \text{Normal}\left[0, \frac{v^2}{\tau} I_N\right].$$

To explicitly write the random vector $\theta_t$, the model may be reformulated as $$Y_t = F_t \theta_t + \epsilon_t,$$

where $$Y_t = \sqrt{\tau} \times (Y_t^{raw}(s_1), \ldots, Y_t^{raw}(s_N))',$$

the residuals are i.i.d. (independent and identically distributed) Gaussian, $$\epsilon_t \sim \text{Normal}\,[0, v^2 I_N]$$

and matrix $F_t \in \mathbb{R}^{N \times GP}$ can be constructed with a N×G matrix of scaled kernel evaluations $$K = \sqrt{\tau} \times (k(s_1), \ldots, k(s_N))',$$

Together with the P×vector $w_d'(t)$ (Equation 11.0):

$$F_t = w_{d(t)}' \otimes K.$$

4.5 Point Measurements Vs. Areal Averages

In the previous sections, a general framework was provided for a multivariate model. Consider a case where there are two types of data: point measurements and areal averages. In an embodiment, to capture the areal averages, integrals are approximated with local quadratic polynomials, where the coefficients are based on the fit provided by Discrete Process Convolutions described above.

Without loss of generality, consider N=2, so that the 2×1 vector of raw observations $Y_t^{raw}(S)$, and a single point measurement, $Y_t^{raw}(s)$. In other words, s is a point in the domain of interest, whereas S is an area in the same domain; therefore $Y_t^{raw}(\bullet)$ corresponds to a point measurement or an areal average, depending on the argument in the parenthesis. Similarly to Equation 1.0 and Equation 10.0, $Y_t^{raw}(S)$ and $Y_t^{raw}(s)$ are modeled as (Equation 12.0):

$$\begin{pmatrix} Y_t^{raw}(S) \\ Y_t^{raw}(s) \end{pmatrix} = \begin{pmatrix} x_t(S) \\ x_t(s) \end{pmatrix} + \zeta_t,$$

where $$\zeta_t \sim \text{Normal}\left[0, \begin{pmatrix} v^2 & 0 \\ 0 & \frac{v^2}{x} \end{pmatrix}\right],$$

$(x_t(S), x_t(s))$ is a vector of "noise-free measurements", $v^2$ is the variance associated with the areal average data set, and $\tau$ is a factor that, together with $v^2$, controls point measurement precision (for example, with $\tau=1$, the two data sources have the same precision).

The spatial and temporal variation $x_t(s)$ is provided by Equation 9.0. On the other hand, for areal average $x_t(S)$, the following approximation is adopted:

$$x_t(S) = \int_S x_t(s) ds \approx n' x_t^{\square},$$

where the 5×1 vector n is constructed as $$n = (8/12, 1/12, 1/12, 1/12, 1/12)',$$

and the 5×1 vector $x_t^{\square}$ contains the values of $x_t$ at the center ("ce"), of the area S, as well as the upper left ("ul"), upper right ("ur"), lower left ("ll") and lower right ("lr") corners of S:

$$x_t^{\square} = (x_t(s^{ce}), x_t(s^{ul}), x_t(s^{ur}), x_t(s^{ll}), x_t(s^{lr}))',$$

Hence, $$x_t(S) \approx (w_t \otimes k(S))' \theta_t,$$

Where the G×1 vector k(S) is provided by (Equation 13.0)

$$k(S) = n' \begin{pmatrix} k(s^{ce}) \\ k(s^{ul}) \\ k(s^{ur}) \\ k(s^{ll}) \\ k(s^{lr}) \end{pmatrix} = \frac{8}{12} k(s^{ce}) + \frac{1}{12}(k(s^{ul}) + k(s^{ur}) + k(s^{ll}) + k(s^{lr})).$$

In other words, the g-th element of this vector consists of the sum $$k_g(S) = 8/12 \, k(s^{ce}, s_g^*) + 1/12 \{k(s^{ul}, s_g^*) + k(s^{ur}, s_g^*) + k(s^{ll}, s_g^*) + k(s^{lr}, s_g^*)\}.$$

In embodiments where isotropic kernels with $\Sigma_i = 4r^2 I_2$ are employed together with a discrete process convolution grid of the same resolution as the gridded data set. As a result, Equation 13.0 simplifies considerably. If the convolution grid is coarser than the gridded data set, no problems would emerge and no additional steps would be needed. However, if the convolution grid is finer than the gridded data set, then it would be more difficult to compute the model's mean temperature across a data grid cell. A fine convolution grid may be used in circumstances where a large number of station observations were available. Coarse convolution grids will lose the fine details of rapid temperature variation across space, which may be undesirable in some cases.

4.6 Model Summary

To summarize the hierarchical model constructed up to this point, the multivariate observation layer of the model is (Equation 14.0):

$$(Y_t | \theta_t, \tau) \sim \text{Normal} [F_t \theta_t, v^2 I_N],$$

where $Y_t \in \mathbb{R}^{N \times 1}$ is a vector of scaled observations, which contains $N_a$ areal averages and $N_p = N - N_a$ scaled point measurements:

$$Y_t = \{Y_t^{raw}(S_1), \ldots, Y_t^{raw}(S_{N_a}), \sqrt{\tau} \times Y_t^{raw}(s_1), \ldots, \sqrt{\tau} \times Y_t^{raw}(s_{N_p})\}'.$$

Matrix $F_t \in \mathbb{R}^{N \times GP}$ is built according to Equation 11.0, it includes temporal components and spatially varying "weights", respectively through vector $w_{d(t)} \in \mathbb{R}^{P \times 1}$ and matrix $K \in \mathbb{R}^{N \times G}$. Equation 8.0 describes $w_{d(t)}$, whereas K is formed as $$K = \{k(S_1), \ldots, k(S_{N_a}), \sqrt{\tau} \times k(s_1), \ldots, \sqrt{\tau} \times k(s_{N_p})\}'.$$

In this expression, the kernel vectors for areal averages are provided by Equation 13.0. Equations 6.0 and 7.0 describe how kernel evaluations are computed and normalized. As an example, the rows of K that correspond to area $S_1$ and location $s_1$, sized 1×G, respectively correspond to $$\begin{pmatrix} \frac{8}{12} k \, [S_1^{ce}, s_1^*] & + \frac{1}{12} & (k[S_1^{ul}, s_1^*] + k[S_1^{ur}, s_1^*] + k[S_1^{ll}, s_1^*] + k[S_1^{lr}, s_1^*]) \\ \frac{8}{12} k \, [S_1^{ce}, s_2^*] & + \frac{1}{12} & (k[S_1^{ul}, s_2^*] + k[S_1^{ur}, s_2^*] + k[S_1^{ll}, s_2^*] + k[S_1^{lr}, s_2^*]) \\ & \vdots & \\ \frac{8}{12} k \, [S_1^{ce}, s_G^*] & + \frac{1}{12} & (k[S_1^{ul}, s_G^*] + k[S_1^{ur}, s_G^*] + k[S_1^{ll}, s_G^*] + k[S_1^{lr}, s_G^*]) \end{pmatrix},$$

and $\sqrt{\tau} \times \left(k[s_1, s_1^*], k[s_1, s_2^*], \ldots, k[s_1, s_G^*]\right).$ Parameter τ defines the precision of station measurements, relative to that of areal estimates. The random vector $\theta_t \in \mathbb{R}^{GP \times 1}$ controls the baseline levels plus the amplitudes and phases of the L intra-annual oscillations. These oscillations are not stationary: rather, $\theta_t$ can evolve as a multivariate random walk, with discount factor δ (Equation 15.0):

$$(\theta_t \mid \theta_{t-1}, \delta) \sim \text{Normal}\left[\theta_{t-1}, \frac{1}{\delta} P_{t-1}^{-1}\right]$$

The large precision matrix $P_t \in \mathbb{R}^{GP \times GP}$ is discussed later in Section 4.7. Finally, the 2×1 vector $(\gamma_0, \gamma_1)$, which enters the computation of $w_{d(t)}$ (see Equation 3.0 and Equation 8.0), defines the decay of evolution variance, from low to high frequencies.

The model is completed by defining the initial distribution of the latent state (Equation 16.0), $$\theta_0 \sim \text{Normal}\ [m_0, P_0^{-1}],$$

Which requires specifying the initial mean $m_0 \in \mathbb{R}^{GP \times GP}$ and the initial precision $P_0 \in \mathbb{R}^{GP \times GP}$. This task is explained below in Section 4.8. Note that the diagonal elements in the covariance matrix $P_0^{-1}$ are referred to as $c_0(s_1^*), \ldots, c_0(s_G^*)$, in Equation 5.0.

Conceptually, the resolution of the discrete process convolution grid can be seen as a free parameter; the same is true for the horizontal and vertical offsets relative to the coordinate axes. In practice, however, it is computationally unfeasible to treat these parameters as continuous and attempt to estimate them like the others. A potential workaround is to choose a few configurations and perform model selection.

4.7 Covariance

According to a theorem proposed by West and Harrison (Bayesian Forecasting and Dynamic Models. Springer Series in Statistics. Springer New York, 1999), for any observable constant Dynamic Linear Model (DMLs), the limiting variance $\lim_{t \to \infty} C_t = C$ exists and is independent of the initial information. Here, this theorem is applied to explore the limiting (or asymptotic) covariance structure of the model, which falls in the category of observable periodic DLMs. Therefore, instead of having a single limiting covariance, the model has 365, as this number corresponds to the longest period of the oscillations in the observation matrix $F_t$.

According to the DLM forward filtering method (again proposed by West and Harrison), the posterior precision at time t is provided by $$P_t = \delta P_{t-1} + \frac{1}{v^2} F'_{d(t)} F_{d(t)}.$$

The recursion can be expanded as:

$$P_t = \delta^2 P_{t-2} + \frac{\delta}{v^2} F'_{d(t-1)} F_{d(t-1)} + \frac{1}{v^2} F'_{d(t)} F_{d(t)} =$$

$$\ldots = \delta^{365} P_{t-365} + \frac{1}{v^2} \sum_{a=0}^{364} \delta^a F'_{d(t-a)} F_{d(t-a)} =$$

$$\delta^{365} P_{t-365} + \frac{1}{v^2} \sum_{a=0}^{364} \delta^a \{w_{d(t-a)} w'_{d(t-a)}\} \otimes (K'K)$$

If it is assumed that t is large and makes use of the theorem, then $P_t = P_{t-365} = P_{d(t)}$, regardless of the day of the year to which that t corresponds. As a result, the expression for this limiting precision is (Equation 17.0):

$$P_{d(t)} = \frac{1}{v^2} X_{d(t)} \otimes (K'K)$$

where $X_{d(t)} \in \mathbb{R}^{P \times P}$ is provided by $$X_{d(t)} = \frac{1}{1 - \delta^{365}} \sum_{a=0}^{364} \delta^a w_{d(t-a)} w'_{d(t-a)}.$$

Unless $\delta \in (0.98, 1)$, it is safe to approximate $\delta^{365} \approx 0$. The asymptotic posterior covariance is given by (Equation 18.0):

$$C_{d(t)} = P_{d(t)}^{-1}$$

$$= v^2 X_{d(t)}^{-1} \otimes (K'K)^{-1}.$$

4.8 Initial Posterior Mean States

Let $\mathbb{D}_0 = \emptyset$ denote the initial information and $\mathbb{D}_t = \{\mathbb{D}_{t-1}, Y_t\}$, for $t = 1, \ldots, T$. If the asymptotic matrix $P_{d(0)}$ is used to specify the initial distribution, $(\theta_0 \mid \mathbb{D}_0) \sim \text{Normal}\ [m_0, P_0^{-1}]$, a model is obtained where all the covariance matrices have converged to their asymptotic values for the very first instant. This strategy also has implications in the computation of posterior means, which is explored in this section.

According to the DLM forward filtering algorithm, the equation for the posterior mean at time t, $m_t \in \mathbb{R}^{GP \times 1}$, is (Equation 19.0):

$$m_t = P_t^{-1}\left(\delta P_{t-1} m_{t-1} + \frac{1}{v^2} F'_t Y_t\right) = \delta P_t^{-1} P_{t-1} m_{t-1} + \frac{1}{v^2} P_t^{-1} F'_t Y_t.$$

Since limiting covariances are used throughout, Equation 17.0 may replace $P_{t-1}$ and $P_t$, regardless of t, and ease the computational complexity:

$$m_t = \delta(X_{d(t)}^{-1} X_{d(t-1)} \otimes I_G) m_{t-1} + X_{d(t)}^{-1} w_{d(t)} \otimes ((K'K)^{-1} K' Y_t).$$

The initial mean, $m_0$, may be equated to the solution of the linear system that employs the first year of data as follows:

$$\begin{pmatrix} Y_1 \\ Y_2 \\ \vdots \\ Y_{365} \end{pmatrix} = \begin{pmatrix} F_1 \\ F_2 \\ \vdots \\ F_{365} \end{pmatrix} m_0 + \begin{pmatrix} \epsilon_1 \\ \epsilon_2 \\ \vdots \\ \epsilon_{365} \end{pmatrix}$$

Where errors are i.i.d. Normal. In other words, this is comparable to a simplified version of Equation 2.0, where the coefficients $\alpha_1(s), \ldots, a_{2L+1}(s)$ are time-invariant:

$$x_t(s_i) = a_1(s_i) + \sum_{f=1}^{L} b_f \times \left\{a_{2f}(s_i) \sin\left[\frac{2\pi f t}{365}\right] + a_{2f+1}(s_i) \cos\left[\frac{2\pi f t}{365}\right]\right\}$$

These coefficients are Gaussian variables, located on the same grid as the original Gaussian processes. Their prior distribution is flat, meaning that their posterior mean equates to the least squares solution of the system described above.

4.9 Log-Likelihood Function $\Psi$ denotes the collection of all time-invariant parameters in the mode: the discount factor $\delta$, the decay parameters $\gamma_0$ and $\gamma_1$, and the seasonality parameter $v$. Full Bayesian inference on $\Psi$ can be performed by specifying appropriate priors and exploring the posterior via MCMC methods. An easier approach comprises specifying uniform priors, so that boundary constraints are satisfied (for example $\gamma_0 \in [0,1]$), and maximizing the posterior density, which is tantamount to maximizing the likelihood. In state-space models, the likelihood can be computed as the product of the one-step forecast densities, via successive application of the Bayes rule:

$$p(Y_1, Y_2, \ldots Y_T | \psi) = p(Y_T | D_{T-1}, \psi) \times p(Y_{T-1} | D_{T-2}, \psi) \times \ldots \times p(Y_1 | D_0, \psi).$$

Thus, the log-likelihood of the entire data set is $$l_\psi(Y_1, Y_2, \ldots, Y_T) = \sum_{t=1}^{T} l_{\psi,t} = \sum_{t=1}^{T} \log p(Y_t | D_{t-1}, \Psi).$$

To keep the notation simple, the dependence of matrices and vectors on W is omitted. The one-step forecast distribution at time t is $$(Y_t | D_{t-1}, \Psi) \sim \text{Normal}[h_t, B],$$

meaning that (Equation 20.0):

$$p(Y_t | D_{t-1}, \Psi) = \frac{1}{(2\pi)^{\frac{N}{2}} |B|^{\frac{1}{2}} \tau^{\frac{Np}{2}}} \times \exp\left[-\frac{1}{2}(Y_t - h_t)' B^{-1} (Y_t - h_t)\right].$$

In these expressions (Equation 21.0):

$$h_t = F_t m_{t-1},$$

The factor $\tau^{Np/2}$ is the Jacobian of the transformation operated on the raw data, and the large covariance matrix $B \in \mathbb{R}^{N \times N}$ is provided by (Equation 22.0):

$$B = \frac{1}{\delta} F_t P_{t-1}^{-1} F_t' + v^2 I_N.$$

At first, it would seem that matrix B depends on t. However, this is not the case because of the use of the limiting precision matrices. First, employ the QR decomposition of matrix $K \in \mathbb{R}^{N \times G}$:

$$K = (QQ^\perp)\begin{pmatrix} R \\ 0 \end{pmatrix} = QR.$$

In this expression, $Q \in \mathbb{R}^{N \times G}$ is the orthonormal rectangular matrix, $Q^\perp \in \mathbb{R}^{N \times (N-G)}$ is the orthogonal complement of Q, $R \in \mathbb{R}^{G \times G}$, upper triangular square matrix, and 0 is a $(N-G) \times G$ matrix of zeroes. Using the definitions of $F_t$ (Equation 11.0) and $P_{d(t)}$ (Equation 17.0), Equation 22.0 is modified into:

$$B = \frac{1}{\delta}(w_{d(t)}' \otimes K)\left(\frac{1}{v^2} X_{d(t-1)} \otimes (K'K)\right)^{-1}(w_{d(t)}' \otimes K)' + v^2 I_N$$

$$= v^2\left(\frac{1}{\delta} w_{d(t)}' X_{d(t-1)}^{-1} w_{d(t)} \otimes K(K'K)^{-1}K' + I_N\right)$$

$$= v^2\left(\frac{1-\delta^P}{\delta^P} \otimes QR(R'Q'QR)^{-1}R'Q' + I_N\right)$$

$$= v^2\left(\frac{1-\delta^P}{\delta^P} QQ' + I_N\right).$$

In order to compute the determinant and the inverse of B, it is useful to obtain its spectral decomposition. First, because of the complementary Q and $Q^\perp$, $$(QQ^\perp)\begin{pmatrix} Q' \\ (Q^\perp)' \end{pmatrix} = QQ' + Q^\perp(Q^\perp)' = I_N.$$

Then, to obtain the spectral decomposition:

$$B = v^2(QQ^\perp)\begin{pmatrix} \frac{1}{\delta^P} I_G & 0 \\ 0 & I_{N-G} \end{pmatrix}\begin{pmatrix} Q' \\ (Q^\perp)' \end{pmatrix}$$

Given this, $\det[B] = |B| = v^{2N} \delta^{-GP}$ and $$B^{-1} = \frac{1}{v^2}(QQ^\perp)\begin{pmatrix} \delta^P I_G & 0 \\ 0 & I_{N-G} \end{pmatrix}\begin{pmatrix} Q' \\ (Q^\perp)' \end{pmatrix}$$

$$= \frac{1}{v^2}(I_N - (1 - \delta^P)QQ').$$

By plugging the determinant of B into the one-step forecast density at time t (using Equation 20.0), $$p(Y_t | D_{t+1} \Psi) = (2\pi)^{-N/2} v^{-N} \delta^{GP/2\tau - Np/2} \exp[-\tfrac{1}{2} e_t' B^{-1} e_t],$$

Where $e_t$ denotes the $N \times 1$ vector of residuals at time t: $e_t = Y_t - h_t$.

Let $z_t = Q'Y_t$ and $a_t = Q'e_t$ denote the $G \times 1$ vectors of transformed observations and residuals, respectively. Then, we may write the log-likelihood $\ell_{\psi,t}$ economically as $$l_{\psi,t} =$$

$$\frac{1}{2}\left(N \log(2\pi v^2) - GP\log(\delta) + Np \log(\tau) + \frac{1}{v^2}\sum_{i=1}^{N} Y_{ti}^2 + \frac{1}{v^2}\sum_{g=1}^{G}(\delta^P a_{gt}^2 - z_{gt}^2)\right)$$

This expression can be used to sample from the posterior distribution of the model parameters in a fully Bayesian implementation.

4.10 Missing Observations

Weather station data sets commonly have missing values. This issue can be addressed by filling in those values with the corresponding one step forecast means, using Equation 21.0. For example, if $Y_t^{raw}(s_i)$ is missing, it can be replaced with $h_t(s_i)$. Under this strategy, the corresponding residual is zero ($e_t(s_i) = 0$) and the number of observations is constant regardless of t.

4.11 Hindcasts and Reforecasts

One of the most important functions of a statistical weather model is to generate probabilistic descriptions of the weather, at locations or instants where information was not provided to the mode. In a Bayesian context, these are called posterior predictive distributions and are extremely valuable, since they form the basis of many validation techniques. In this section and the following, the process through which those distributions can be derived from the proposed model after the model has been fitted to the data is described.

Assume a set of $N_f$ locations $s_1^*, \ldots s_{N_f}^*$, which need not coincide with the original set $s_1, \ldots, s_N$. Given all the information available up to time t, the goal is to obtain the distribution of $Y_t^*$ (i.e., hindcasts) and $Y_{t+1}^*, Y_{t+2}^*, \ldots$ (i.e., re-forecasts).

Under the model specified earlier, the distribution of these random vectors is $$(Y_{t+l}^*|D_t) \sim \text{Normal } [h_{t+l}, B_{t+l}^*], l=0,1,\ldots$$

such that $$h_{t+1}^* = (w'_{d(t+1)} \otimes K^*) m_t,$$

$$B_{t+1}^* = \frac{1}{\delta l}(w'_{d(t+l)} \otimes K^*) C_{d(t)} (w'_{d(t+l)} \otimes K^*)' + v^2 I_{N_f}$$
$$= x_{t,l} K^* (K'K)^{-1} (K^*)' + v^2 I_{N_f}$$
$$= x_{tl} (K^* R^{-1})(K^* R^{-1})' + v^2 I_{N_f}$$

where $K^* \in \mathbb{R}^{N_f \times G}$ is the kernel matrix for the locations where the hindcast/re-forecast is to be computed, $$x_{t,l} = \frac{v^2}{\delta l} w'_{d(t+l)} X_{d(t)}^{-1} w_{d(t+l)}.$$

and $C_{d(t)}$ is defined in Equation 18.0.

Due to the discount factors ($0<\delta \leq 1$), the variance $B_{t+l}^*$ grows exponentially with lead l. This can be undesirable for long-term forecasting but may be mitigated by setting $\delta \approx 1$. The penalty associated with this measure is that the model may become overly smooth in time.

4.12 Backward Smoothing

Another potential use is to discover the historical states of the Gaussian processes given observations up to the present. These can be described by the smooth distribution $(\theta|D_T) \sim \text{Normal}(\tilde{m}_t, \tilde{C}_t)$, where $\tilde{m}_t \in \mathbb{R}^{GP \times 1}$ and $\tilde{C}_t \in \mathbb{R}^{GP \times GP}$ can be calculated recursively from $$\tilde{m}_t = (1-\delta)m_t + \delta \tilde{m}_{t+1}$$

$$\tilde{C}_t = (1-\delta)C_t + \delta^2 \tilde{C}_{t+1}$$

for $$t = T-1, T-2, \ldots, 1, \text{ and } \tilde{m}_T = \tilde{m}_T, \tilde{C}_T = C_T$$

The retrospective descriptions of the states of processes enables estimation at locations of interest that are not described by the data set, at any historical time. These locations can be anywhere in the spatial domain, provided that at least one discrete process convolution grid point is within their range. Locations may be on a grid or not, global or regional, and the grid resolution may be higher than, equal to, or lower than the original resolution of the climate model output.

The posterior predictive distribution for quantities at $N_s$ locations of interest, $\tilde{Y}_t$ is $$(\tilde{Y}_t|D_T) \sim \text{Normal } [\tilde{h}_t, \tilde{B}_t],$$

where $\tilde{h}_t \in \mathbb{R}^{N_s \times 1}$ and $\tilde{B}_t \in \mathbb{R}^{N_s \times N_s}$ are give by $$\tilde{h}_t = (w_t' \otimes \tilde{K}) \tilde{m}_t,$$

$$\tilde{B}_t = (w_t' \otimes \tilde{K}) \tilde{C}_t (\tilde{K} \otimes w_t),$$

and $\tilde{k} \in \mathbb{R}^{N_s \times G}$ is a kernel matrix for locations where the posterior predicative distribution is to be computed.

4.13 Backward Sampling

In some cases, it is beneficial to obtain simulations of the latent processes, such as for sample-based studies. Under the dynamic linear modeling framework, it is possible to sample the vectors $\theta_1, \ldots, \theta_T$ from their joint posterior distribution, $p(\theta_1, \ldots, \theta_T|D_T)$, using a backward sampling algorithm.

At time t, the backward sampling variance is:

$$C_t = u_t P_t^{-1} = u_t v^2 X_{m(t)}^{-1} \otimes (K'K)^{-1}$$

where $$u_t = \begin{cases} 1, \text{ if } t = T \\ (1-\delta), \text{ if } t \in \{1, \ldots, T-1\} \end{cases},$$

and the backward sampling mean is $$m_t = \begin{cases} m_T, \text{ if } t = T \\ (1-\delta)m_t + \delta\theta_{t+1}, \text{ if } t \in \{1, \ldots, T-1\} \end{cases}.$$

Given the above, the backward sampling distribution for $\theta_{1:T-1}$ is written as $$(\theta_t|D_t, \theta_{t+1}) \sim \text{Normal } [m_t, u_t v^2 x_{m(t)}^{-1} \otimes (K'K)^{-1}].$$

A fast-backward sampling algorithm is as follows:
1. For $d \in \{1, 2, \ldots, 365\}$,
   (a) compute $U_d$ as the upper Cholesky factor of $X_d$, i.e., $X_d = U'_d U_d$;
   (b) compute $O_{d(t)} = U_{d(t)} \otimes R$
2. For $t \in \{T, T-1, \ldots, 1\}$ do
   (a) Sample $z_t \sim \text{Normal } [0, I_{G_P}]$;
   (b) Set $O_t = +m_t$
3. Return $O_T = \{\theta_1, \theta_2, \ldots, \theta_T\}$ The ability to generate ensembles of $D_T$, which include spatial and temporal dependencies, helps determine the uncertainty quantification.

5.0 Data Blending Process Flow

Figure 6:
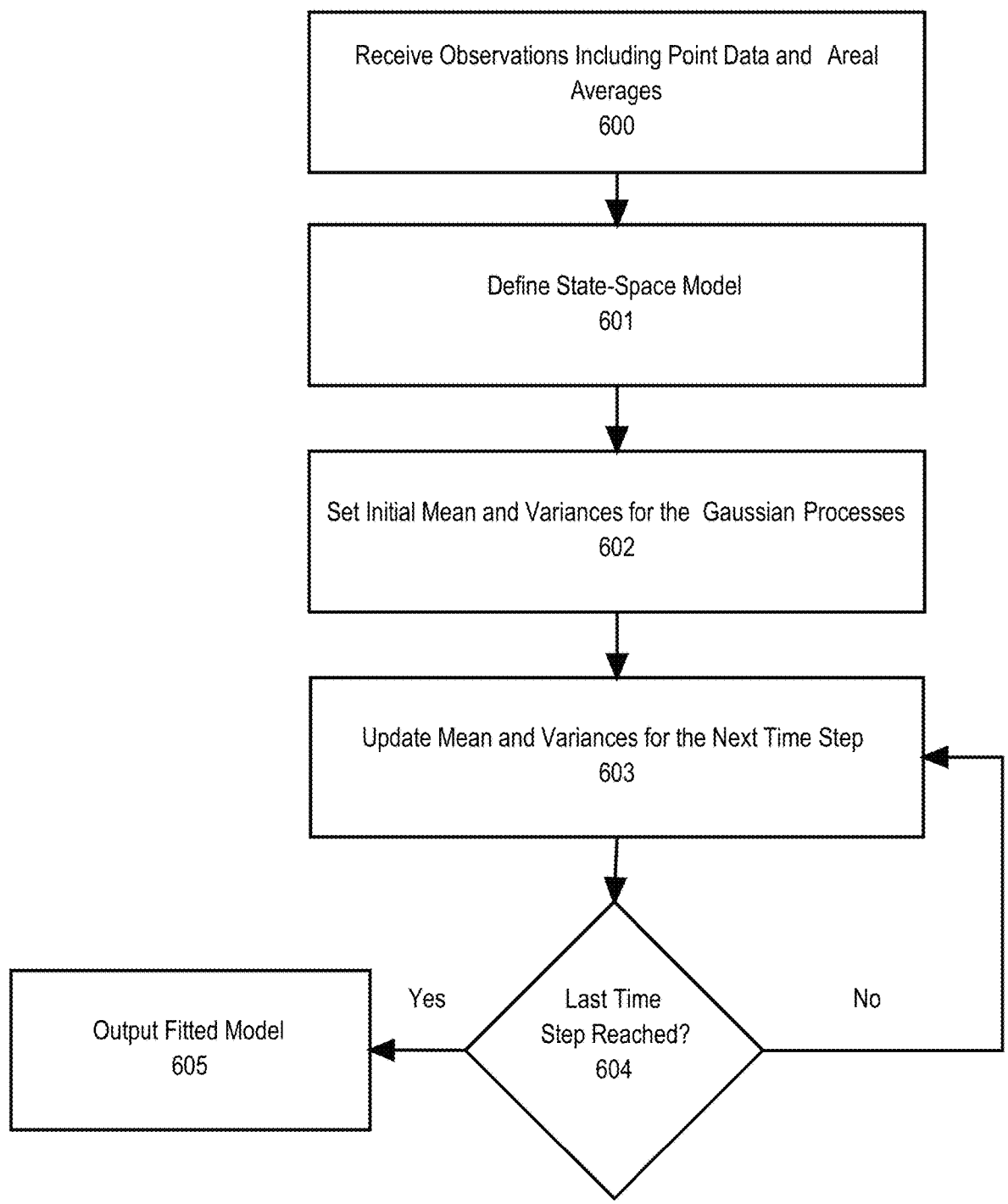
FIG. 6 illustrates an example process flow for blending point data and areal averages in block diagram according to an embodiment.

FIG. 6 illustrates a process for fitting a model that blends point data with areal averages in block diagram form according to an embodiment. FIG. 6 represents an example of the aforementioned process and may vary between different embodiments. For example, the steps recited in the blocks of FIG. 6 may be divided out into multiple sub-steps, combined into a smaller set of steps, performed in a different order, and so forth in other embodiments. In order to illustrate clear examples, the following description assumes that the process flow of FIG. 6 is performed by the data blending subsystem 170.

In FIG. 6, at block 600 the weather data input module 171 receives observation data 501 for an environmental variable, which includes point data and areal averages, at corresponding times and locations. Examples of observations that may be obtained and sources from which the weather data input module 171 obtains the observation data 501 is described in more detail above in Section 3.0 "Example System Inputs". In some embodiments, the weather data input module 171 is configured to receive user input from the field manager computing device 104 that specifies the source(s) from which to obtain the observation data 501 and/or the type of environmental variable the observation data 501 represents. In other embodiments, the data blending subsystem 170 is invoked by another application (not depicted in FIG. 1) that supplies the sources from which to obtain the observation data 501. In yet other embodiments, the weather data input module 171 reads a configuration file that specifies where to obtain the observation data 501.

At block 601, the model fitting module 172 defines a state-space model that represents the behavior of the environmental variable across space and time. In some embodiments, the state-space model includes an observation equation that describes how observations from different sources relate to gridded, latent Gaussian processes, a state equation that describes how the Gaussian processes evolve over time, and an initial state equation that describes the mean and variance of the Gaussian processes at an initial state used to drive the model.

In an embodiment, the observation equation appears as $Y_t = F_t \theta_t + \epsilon_t$, where $Y_t$ is a vector of observations collected at time $t \in \{1, \ldots, T\}$ at multiple locations; $F_t$ is a matrix that maps those observations to a vector of latent Gaussian processes $\theta_t$; and $\epsilon_t$ is a vector of Gaussian measurement errors, $\epsilon_t \sim N[0, v^2 I]$. The observation equation describes how observations from different sources (for example point measurements, areal averages) relate to gridded, latent Gaussian processes. Matrix $F_t$ is responsible for this mapping. In some embodiments, each entry in $F_t$ is constructed by evaluating a function (kernel) that only takes non-zero values within a predefined spatial range. As a result $F_t$ is a sparse matrix, meaning that computations involving $F_t$ can be performed quickly using techniques such as sparse matrix multiplication. The kernel function used depends on whether the corresponding observation is a point measurement or an areal average. The non-zero entries of matrix $F_t$ are multiplied by several temporal harmonics (i.e., sines and cosines with varying periods), so that the model is able to capture seasonal variability. Thus, the latent Gaussian processes $\theta$ capture the spatial and temporal variation of the seasonal cycles. Finally, measurement error is captured through vector $\epsilon_t$. In some embodiments, for simplicity, the aforementioned errors are assumed to be spatially and temporally uncorrelated. In some embodiments, the variance of the point measurements is allowed to differ from the variance of the errors of areal measurements.

In an embodiment, the state equation appears as $\theta_t = \theta_{t-1} + v_t$, where $v_t$ is a vector of spatially correlated, but temporally independent, Gaussian shocks. The state equation describes how the latent Gaussian processes evolve over time. In order words, the mean and the variance of this multivariate Gaussian vector depends on time. The equation above states that, to know the current mean and variance, all that is needed to be known is the mean and variance of the state at the previous time step (a so-called first-order Markovian process). In some embodiments, the mean and the Gaussian shocks $v_t$ is set to zero, implying that persistence is favored, but the variance is not diagonal meaning that there is some spatial coherence in the shocks.

In an embodiment, the initial state equation appears as $\theta_0 = m_0 + v_0$, where $m_0$ is a fixed vector of initial means and $v_0$ is an initial vector of Gaussian shocks. The initial state equation specifies how the model is started. For example, if the period under analysis is 200-2016, this equation describes the mean and variance of the vector of latent Gaussian processes in the year 200. In some embodiments, the mean is defined by considering data that precedes the starting date, so that the model does not provide unrealistic results as it moves into the first years of the period under analysis.

At block 602, the model fitting module 172 sets the initial mean and variance of the Gaussian processes. In some embodiments, the initial mean and variance are set upon exploratory data analysis or through the fitting of a simple linear regression model to one year of withheld data which precedes the period under analysis.

At block 603, the model fitting module 172 updates the mean and variance of the Gaussian processes for the next time step. In an embodiment, the procedure used to infer the mean and variance of the latent Gaussian processes is a Bayesian generalization of the Kalman Filter. Assume that the mean and variance are known for a given time step (which is true for the initial time step at block 602). The state equation then provides a preliminary update of the mean and variance for the next time step. Using the observation equation, the mean and variance for the observations at the new time step can be derived both for the point data and the areal data. The mean and variance for the observations at the new time step computed via the state equation are then compared to the mean and variance of the observations from the observation data 501 received at block 600. The mean and variance for the observations at the new time step computed via the state equation are then updated according to Bayes' rule.

At block 604, the model fitting module 172 determines whether the last time step has been reached. In an embodiment, the model fitting module 172 starts at the first time step of the observation set received at block 600 and continues until the last time step represented in the observation set. Therefore, in some embodiments, the model fitting module 172 determines whether the last time step represented within the observation set has been reached, and if so, proceeds to block 605 where the fitted model 502 is output to the weather analysis module 173. However, in other embodiments, the fitted model 502 may be stored within the model data and field data repository 160 for later retrieval by the weather analysis module 173. If the last time step has not been reached, the model fitting module 172 returns to block 603 to perform the update for the next time step.

6.0 Prediction Process Flow

One potential use of the fitted model is to determine a predicted value of the environmental variable for a location/time for which the value was previously unknown. For simplicity, the examples provided in the section pertain to the case where the time at which to predict the environmental variable is within the range of $1 \leq t \leq T$ and thus the time step belongs to the period under analysis, where T is the final instant under analysis. However, the location $\ell$ does not need to belong to those surveyed in the initial observations. For times beyond T the one-step forecast distribution described earlier can be used to forecast temperature at time T+1. This formula can be used recursively to get estimates for T+2, T+3, and so forth.

Figure 7:
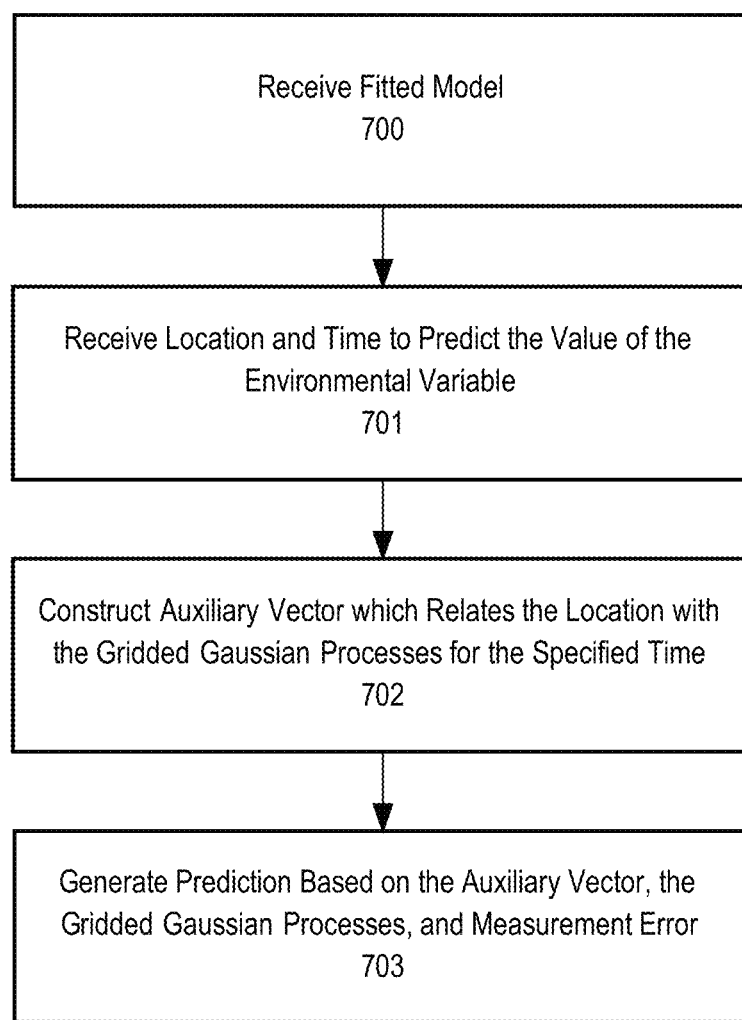
FIG. 7 illustrates how to use a fitted model to generate a prediction of an environmental variable at a given time and location in block diagram form according to an embodiment.

FIG. 7 illustrates an example process flow for determining a predicted value of the environmental variable based on a fitted model in block diagram form according to an embodiment. FIG. 7 represents an example of the aforementioned process and may vary between different embodiments. For example, the steps recited in the blocks of FIG. 7 may be divided out into multiple sub-steps, combined into a smaller set of steps, performed in a different order, and so forth. In order to illustrate clear examples, the following description assumes that the process flow of FIG. 7 is performed by the data blending subsystem 170.

In FIG. 7, at block 700, the weather analysis module 173 receives a fitted model 502. In an embodiment, the fitted model 502 is represented by the observation equation, state equation, and initial state equation in addition to the means and variances of the gridded Gaussian processes determined when the model was fitted according to process described above in relation to FIG. 6. In some embodiments, the weather analysis model 173 receives the fitted model 502 from the model fitting module 172. However, in other embodiments, the model fitting module 172 may store the fitted model 502 in the model data and field data repository 160. In such embodiments, the weather analysis module 173 retrieves the fitted model 502 from the model data and field data repository 160.

At block 701, the weather analysis module 173 receives the location and time to predict the value of the environmental variable. In some embodiments, the weather analysis module 173 receives the time step and location at which to predict a value for the environmental variable based on user input received from the field manager computing device 104. In some embodiments, more than one pair of time step/locations are received at block 701. In such cases, block 702 and block 703 are repeated for each pair in order to obtain the corresponding predicted value and variance. In some embodiments, the user input specifies whether the location is for a point measurement or an areal average. However, in other embodiments whether the location is for a point measurement or an areal average can be inferred by the weather analysis module 173 based on the form of the input. For example, a location for a point measurement may be specified as (x,y) coordinates, whereas an areal average may be specified by grid location or a set of points forming the corners of the grid over which the areal average will be predicted.

At block 702, the weather analysis module 173 constructs an auxiliary vector which relates to the location with the gridded Gaussian processes for the specified time. Assuming that the mean ($m_t$) and the variance ($V_t$) of the latent Gaussian processes at time t are available, an auxiliary vector $f_t$ can be constructed which relates the location $\ell$ with the gridded Gaussian processes. The entries in this vector $f_t$ are constructed using the same kernels that were employed to fit the model to the observation data 501. However, the evaluations obtained are unique because the location is one for which an observation was not recorded. The kernel that is used depends on whether $\ell$ is a point location or an areal average. The non-zero kernel evaluations are then multiplied with the sine and cosine evaluations pertaining to the instant t. The result is the auxiliary vector $f_t$.

At block 703, the weather analysis module 173 generates a prediction based on the auxiliary vector, the gridded Gaussian processes, and measurement error. In an embodiment, after $f_t$ is obtained from block 702, the weather analysis module 173 calculates the inner product of $f_t$ and the vector of Gaussian processes $\theta_t$ and adds measurement error: $f_t'\theta_t+\epsilon_t(\ell)$. The result yields a new scalar random variable, $\overline{Y}_t(\ell)$ with scalar mean $f_t'm_t$ and scalar variance $f_t'V_tf_t+v^2$. This random variable provides the predicted mean and variance of an environmental variable at a previously unknown spatio-temporal coordinate.

6.0 Example Applications

The techniques described herein can be used to blend point data and areal averages for many different purposes. In some embodiments, the fitted model 502 can be used to generate analyses and/or reanalyzes. As described above, analyses and reanalyzes are typically generated by starting from an initial state of the environmental system and iterating a physical process over a number of time steps to obtain a value for each area of a grid. Since the fitted model 502 allows the initial state to be generated using both point values and areal averages, the initial state for the analyses/reanalyzes generated using the fitted model 502 incorporates additional information that has been blended and smoothed to provide a better snapshot of the environmental variable(s) at a given initial time over an area of space. Thus, an analyses or reanalyzes generated using the fitted model 502 to determine an initial state should ostensibly be more accurate than using point data or areal averages separately to set the initial state. Furthermore, the fitted model 502 may be used to set the initial state of a forecast model or to evaluate the skill of a forecast model. For example, to evaluate skill the fitted model 502 could be used to generate predicted values and variances of the environmental variable(s) which can be compared to the result of the forecast model to determine the accuracy of the forecast model.

Additional use cases may also include (1) generating temporally and spatially coherent simulations (e.g. of temperature), which make use of the information contained in multiple data sources (i.e. stations and areal averages). The word "coherent" means that spatial and temporal correlation are taken into account, (2) interpolating the gridded data product on to finer grids, making use of available point information, (3) detecting and correcting erroneous point measurements, as they can be compared with the predictive distribution provided by the model, (4) quantifying the uncertainty and/or calibrate numerical model output, based on station measurements, and (5) making short-term forecasts, using the time-series properties of the model.

7.0 Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

8.0 Additional Disclosure

Aspects of the subject matter described herein are set out in the following numbered clauses:

1. A method comprising: receiving a set of observations of an environmental variable, wherein: the set of observations includes one or more point observations and one or more areal average observations, each point observation of the one or more point observations specifies a value and a variance of the environmental variable at a particular location of an area under observation and a time step of a set of time steps, and each areal average observation of the one or more areal average observations specifies a value and a variance for a district of a grid superimposed over the area under observation and a time step of the set of time steps; defining a state-space model that maps the one or more point observations and the one or more areal average observations onto a gridded set of latent Gaussian processes and describes how the set of latent Gaussian processes evolves over time; setting an initial mean and an initial variance for each Gaussian process of the set of latent Gaussian processes in the state-space model based on observations of the set of observations that relate to an initial time step of the set of time steps; starting with the initial time step of the set of time steps and ending at a final time step of the set of time steps, fitting the state-space model to the set of observations by, for each Gaussian process of the set of latent Gaussian processes: generating a predicted mean and a predicted variance for a next time step of the Gaussian process based on the state-space model, a mean of the Gaussian process at a current time step of the set of time steps, and a variance of the Gaussian process at the current time step; and updating the predicted mean and the predicted variance based on one or more observations of the set of observations that relate to the next time step, resulting in a mean and a variance of the Gaussian process for the next time step.

2. The method of Clause 1, wherein updating the predicted mean and the predicted variance is performed according to Bayes' rule.

3. The method of any of Clauses 1-2, wherein the state-space model specifies that the set of latent Gaussian processes is updated at each time step by applying a vector of spatially correlated, but temporally independent, Gaussian shocks.

4. The method of any of Clauses 1-3, further comprising: receiving a location and a time step for which to predict a value and a variance of the environmental variable; estimating the value and the variance of the environmental variable based on the fitted state-space model.

5. The method of Clause 4, wherein estimating the value and the variance of the environmental variable is performed by: constructing an auxiliary vector which relates the location to Gaussian processes of the fitted state-space model for the time step; estimating the value and the variance of the environmental variable based on the auxiliary vector, the Gaussian processes, and measurement error.

6. The method of any of Clauses 1-5, wherein the one or more point observations represent measurements taken from one or more weather stations and the one or more areal average observations represent measurements taken from one or more of: one or more reanalysis products or one or more satellite images.

7. The method of any of Clauses 1-6, wherein the state-space model maps the one or more point observations and the one or more areal average observations to the set of latent Gaussian processes using a sparse matrix.

8. The method of Clause 7, wherein each entry of the sparse matrix is constructed by evaluating a kernel function that only takes non-zero values within a predefined spatial range.

9. The method of any of Clauses 7-8, wherein the sparse matrix is multiplied by a plurality of temporal harmonics to capture seasonal variability.

10. The method of any of Clauses 1-9, further comprising, in response to determining that a point observation for a particular time step is missing from the one or more point observations, using a value and a variance of a corresponding areal average observation of the set of areal average observations instead when fitting the state-space model.

11. The method of any of Clauses 1-10, wherein the state-space model maps the one or more point observations and the one or more areal average observations onto the gridded set of latent Gaussian processes using compactly supported kernels which then held sparse covariance matrices.

12. The method of any of Clauses 1-11, wherein the state space model takes into one or more of: measurement error of the set of observations or estimation error of the set of observations.

13. The method of any of Clauses 1-12, wherein fitting the state-space model applies Bayes' rule to update spatial covariance matrices such that the spatial covariance matrices remain sparse during a forward fitting stage and a backward smoothing stage.

14. The method of any of Clauses 1-13, wherein the state-space model accounts for a multitude of seasonal signals, as well as spatial correlation, and allows for a magnitude of the seasonal signals and the spatial correlation to vary across space.

15. One or more non-transitory computer-readable media storing instructions that, when executed by one or more computing devices, causes performance of any one of the methods recited in Clauses 1-14.

16. A system comprising one or more computing devices comprising components, implemented at least partially by computing hardware, configured to implement the steps of any one of the methods recited in Clauses 1-14.

What is claimed is:

1. A method comprising:
receiving set of observations and set of areal average observations for a field;
defining a state-space model that maps the set observations and the set of areal average observations onto a set of latent Gaussian processes and describes how the set of latent Gaussian processes evolves over time;
setting an initial mean and an initial variance for each Gaussian process of the set of latent Gaussian processes in the state-space model based on observations of the set of observations that relate to an initial time step of a set of time steps;
starting with the initial time step of the set of time steps and ending at a final time step of the set of time steps, for each Gaussian process of the set of latent Gaussian processes, repeating a process of fitting the state-space model to the set of observations by:
generating a predicted mean and a predicted variance for a next time step of the Gaussian process based on the state-space model, a mean of the Gaussian process at a current time step of the set of time steps, and a variance of the Gaussian process at the current time step; and
updating the predicted mean and the predicted variance based on one or more observations of the set of observations that relate to the next time step, resulting in a mean and a variance of the Gaussian process for the next time step and updating, using the mean and the variance of the Gaussian process, the state-space model to improve accuracy of a weather forecast for the area under observation.

2. The method of claim 1, wherein the set of observations includes one or more point-observations, each point observation of the one or more point-observations specifies a value and a variance of an environmental variable at a particular location of an area under observation and a time step of a set of time steps, and each areal average observation of the set of areal average observations specifies a value and a variance for a district of a grid superimposed over the area under observation and a time step of the set of time steps;
wherein updating the predicted mean and the predicted variance is performed according to a Bayes rule.

3. The method of claim 2, wherein the state-space model specifies that the set of latent Gaussian processes is updated at each time step by applying a vector of spatially correlated, but temporally independent, Gaussian shocks.

4. The method of claim 3, further comprising: receiving a location and a time step for which to predict a value and a variance of the environmental variable; and
estimating the value and the variance of the environmental variable based on a fitted state-space model.

5. The method of claim 4, wherein the estimating of the value and the variance of the environmental variable is performed by: constructing an auxiliary vector which relates the location to Gaussian processes of the fitted state-space model for the time step; and
estimating the value and the variance of the environmental variable based on the auxiliary vector, the Gaussian processes, and a measurement error.

6. The method of claim 5, wherein the one or more point-observations represent measurements taken from one or more weather stations and the set of areal average observations represents measurements taken from one or more of: one or more reanalysis products or one or more satellite images.

7. The method of claim 6, wherein the fitted state-space model maps the one or more point-observations and the set of areal average observations to the set of latent Gaussian processes using a sparse matrix.

8. The method of claim 7, wherein each entry of the sparse matrix is constructed by evaluating a kernel function that only takes non-zero values within a predefined spatial range.

9. The method of claim 8, wherein the sparse matrix is multiplied by a plurality of temporal harmonics to capture a seasonal variability.

10. The method of claim 9, further comprising: in response to determining that a point observation for a particular time step is missing from the one or more point-observations, using a value and a variance of a corresponding areal average observation of the set of areal average observations instead when fitting the fitted state-space model.

11. The method of claim 10, wherein the fitted state-space model maps the one or more point-observations and the set of areal average observations onto the set of latent Gaussian processes using compactly supported kernels configured to hold sparse covariance matrices.

12. The method of claim 11, wherein the fitted state-space model takes into consideration one or more of: a measurement error of the set of observations or an estimation error of the set of observations.

13. The method of claim 12, wherein the fitting of the fitted state-space model applies the Bayes rule to update spatial covariance matrices such that the spatial covariance matrices remain sparse during a forward fitting stage and a backward smoothing stage.

14. The method of claim 13, wherein the fitted state-space model accounts for a multitude of seasonal signals, as well as a spatial correlation, and allows for a magnitude of a multitude of seasonal signals and the spatial correlation to vary across a space.

15. One or more non-transitory computer-readable storage media storing one or more computer executable instructions which, when executed by one or more processors, cause the one or more processors to perform:
receiving set of observations and set of areal average observations for a field;
defining a state-space model that maps the set observations and the set of areal average observations onto a set of latent Gaussian processes and describes how the set of latent Gaussian processes evolves over time;
setting an initial mean and an initial variance for each Gaussian process of the set of latent Gaussian processes in the state-space model based on observations of the set of observations that relate to an initial time step of a set of time steps;
starting with the initial time step of the set of time steps and ending at a final time step of the set of time steps, for each Gaussian process of the set of latent Gaussian processes, repeating a process of fitting the state-space model to the set of observations by:
generating a predicted mean and a predicted variance for a next time step of the Gaussian process based on the state-space model, a mean of the Gaussian process at a current time step of the set of time steps, and a variance of the Gaussian process at the current time step; and
updating the predicted mean and the predicted variance based on set of observations of the set of observations that relate to the next time step, resulting in a mean and a variance of the Gaussian process for the next time step and updating, using the mean and the variance of the Gaussian process, the state-space model to improve accuracy of a weather forecast for the area under observation.

16. The one or more non-transitory computer-readable storage media of claim 15, wherein the set of observations includes one or more point-observations, each point observation of the one or more point-observations specifies a value and a variance of an environmental variable at a particular location of an area under observation and a time step of a set of time steps, and each areal average observation of the set of areal average observations specifies a value and a variance for a district of a grid superimposed over the area under observation and a time step of the set of time steps;
wherein updating the predicted mean and the predicted variance is performed according to a Bayes rule.

17. The one or more non-transitory computer-readable storage media of claim 16, wherein the state-space model specifies that the set of latent Gaussian processes is updated at each time step by applying a vector of spatially correlated, but temporally independent, Gaussian shocks.

18. The one or more non-transitory computer-readable storage media of claim 17, storing additional instructions for: receiving a location and a time step for which to predict a value and a variance of the environmental variable; and
estimating the value and the variance of the environmental variable based on a fitted state-space model.

19. The one or more non-transitory computer-readable storage media of claim 18, wherein estimating a value and a variance of the environmental variable is performed by: constructing an auxiliary vector which relates a location to Gaussian processes of the fitted state-space model for a time step; and
estimating the value and the variance of the environmental variable based on the auxiliary vector, the Gaussian processes, and measurement error.

20. The one or more non-transitory computer-readable storage media of claim 19, wherein the one or more point-observations represent measurements taken from one or more weather stations and the set of areal average observations represents measurements taken from one or more of: one or more reanalysis products or one or more satellite images.

* * * * *